(12) United States Patent
Masuda et al.

(10) Patent No.: US 7,671,500 B2
(45) Date of Patent: Mar. 2, 2010

(54) MOTOR USING WORKING FLUID DISTRIBUTED INTO CHAMBERS, WHICH ARE PROVIDED FOR ROTATING ROTORS IN OPPOSITE RELATIVE ROTATION DIRECTIONS

(75) Inventors: Jun Masuda, Utsunomiya (JP); Ryo Ninomiya, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 308 days.

(21) Appl. No.: 11/790,959

(22) Filed: Apr. 30, 2007

(65) Prior Publication Data
US 2007/0296296 A1 Dec. 27, 2007

(30) Foreign Application Priority Data
Jun. 27, 2006 (JP) ............... 2006-176296

(51) Int. Cl.
H02K 21/16 (2006.01)
(52) U.S. Cl. .............. 310/112; 310/114; 310/119
(58) Field of Classification Search ............ 310/68 B, 310/112–114, 119, 266; 123/90.15–90.17, 123/90.27, 90.31; 74/568 R; 464/1–2, 160
See application file for complete search history.

(56) References Cited

U.S. PATENT DOCUMENTS

| | | | |
|---|---|---|---|
| 6,049,152 A * | 4/2000 | Nakano | 310/114 |
| 6,481,401 B1 * | 11/2002 | Schafer | 123/90.17 |
| 6,497,208 B2 * | 12/2002 | Miyasaka | 123/90.17 |
| 6,553,951 B2 * | 4/2003 | Ogawa | 123/90.17 |
| 6,563,246 B1 | 5/2003 | Kajiura et al. | |
| 6,725,817 B2 * | 4/2004 | Methley et al. | 123/90.17 |
| 6,798,104 B2 | 9/2004 | Kajiura et al. | |
| 6,998,757 B2 * | 2/2006 | Seguchi et al. | 310/266 |

FOREIGN PATENT DOCUMENTS

| | | |
|---|---|---|
| JP | 11-236807 A | 8/1999 |
| JP | 2001-263304 A | 9/2001 |
| JP | 2002-058223 A | 2/2002 |
| JP | 2002-204541 A | 7/2002 |
| JP | 2004-072978 A | 3/2004 |
| JP | 2004-100727 A | 4/2004 |

* cited by examiner

*Primary Examiner*—Tran N Nguyen
(74) *Attorney, Agent, or Firm*—Arent Fox LLP

(57) ABSTRACT

A motor includes inner-peripheral and outer-peripheral rotors which rotate coaxially and have permanent magnets along a circumference of each rotor; and a phase varying device for relatively rotating the rotors so as to vary a relative phase therebetween. The device has a forward-angle working chamber for relatively rotating the inner-peripheral rotor forward with respect to the outer-peripheral rotor, by using pressure of supplied working fluid; a backward-angle working chamber for relatively rotating the inner-peripheral rotor backward with respect to the outer-peripheral rotor, by using pressure of supplied working fluid; a passage switching valve for performing distribution with respect to supply and drainage of the working fluid between the working chambers in accordance with the position of a spur; and an electromagnetic pressure control valve for controlling pressure of the working fluid, and for controlling the position of the spur in the passage switching valve based on the controlled pressure.

7 Claims, 15 Drawing Sheets

(SAME POLE-POSITION SETTING: STRENGTHENED MAGNETIC FIELD)

(OPPOSITE POLE-POSITION SETTING: WEAKENED MAGNETIC FIELD)

MOTOR USING WORKING FLUID DISTRIBUTED INTO CHAMBERS, WHICH ARE PROVIDED FOR ROTATING ROTORS IN OPPOSITE RELATIVE ROTATION DIRECTIONS

BACKGROUND OF THE INVENTION

1. Field of the Invention

The present invention relates to an (electric) motor having permanent magnets in a rotor, in particular, to a motor in which magnetic-field characteristics of the permanent magnets in the rotor are variable.

Priority is claimed on Japanese Patent Application No. 2006-176296, filed Jun. 27, 2006, the content of which is incorporated herein by reference.

2. Description of the Related Art

In a known example of such a motor, an inner-peripheral rotor and an outer-peripheral rotor, each individually having permanent magnets, are arranged coaxially, and they are relatively rotated along a circumferential direction (i.e., the relative phase between the rotors is changed), so that the magnetic-field characteristics of the whole rotor are variable (see, for example, Japanese Unexamined Patent Application, First Publication No. 2002-204541).

In this motor, in order to vary the relative phase between the inner-peripheral and outer-peripheral rotors in accordance with the rotation speed of the motor, one of the rotors is rotated with respect to the other along the circumferential direction, by using a member which is displaced along a radial direction due to centrifugal force. On the other hand, in order to vary the relative phase between the inner-peripheral and outer-peripheral rotors in accordance with the rotation speed of the rotational magnetic field generated in a stator, relative positions of the rotors along the circumferential direction are changed by applying a control current to stator windings while each rotor maintains the relevant rotation speed by means of inertia.

In the above-described motor, when the permanent magnets of the outer-peripheral and inner-peripheral rotors are made to face each other in a manner such that opposite poles (i.e., N-pole and S-pole) face each other (i.e., each rotor has the same pole-position setting), the magnetic field of the whole rotor is strengthened, and induced voltage is increased. In contrast with this, when the permanent magnets of the outer-peripheral and inner-peripheral rotors are made to face each other in a manner such that the same poles (i.e., N-poles or S-poles) face each other (i.e., opposite pole-position settings are selected), the magnetic field of the whole rotor is weakened, and induced voltage is decreased.

However, in the above conventional motor, conditions for varying the relative phase between the outer-peripheral and inner-peripheral rotors are limited, and it is impossible to freely vary the relative phase when the motor is stopped or involuntarily rotated. In particular, when such a motor is used for driving a hybrid vehicle or an electrically-driven vehicle, it is required to instantly change the characteristics of the motor, in accordance with the driving state of the vehicle, to desired ones. In order to satisfy such a requirement, it is important to improve the degree of freedom in the control for varying the relative phase.

SUMMARY OF THE INVENTION

In light of the above circumstances, the applicant of the present invention has invented a method of incorporating a phase-varying device using a working fluid into the motor, and examined efficient supply and drainage control of the working fluid. More specifically, a phase-varying device has been examined which has (i) a forward (or advance)-angle working chamber by which the inner-peripheral rotor is relatively rotated along a forward-angle direction with respect to the outer-peripheral rotor, and (ii) a backward-angle working chamber by which the inner-peripheral rotor is relatively rotated along a backward-angle direction with respect to the outer-peripheral rotor, where supply of the working fluid to the working chambers is controlled using an electromagnetic valve.

In this case, when the passage of the working fluid supplied to each working chamber is controlled using such an electromagnetic valve, it is necessary to supply a relatively large amount of working fluid when the phase is varied; thus, the size of the electromagnetic valve must be increased. In addition, if an individual control mechanism using the electromagnetic valve or the like is provided to each working chamber, the number of necessary parts should be increased, thereby causing increases in a relevant occupied space in the motor and the manufacturing cost.

Therefore, an object of the present invention is to provide a motor in which the relative phase between the outer-peripheral rotor and the inner-peripheral rotor can be voluntarily varied using a working fluid, without causing increases in the size and the number of parts of the motor, thereby decreasing the manufacturing cost and improving flexibility in the degree of freedom with respect to the control of varying the relative phase.

Therefore, the present invention provides a motor comprising:

an inner-peripheral rotor (e.g., an inner-peripheral rotor 6 in embodiments explained later) having permanent magnets (e.g., permanent magnets 9 in the embodiments) which are arranged along a circumference thereof;

an outer-peripheral rotor (e.g., an outer-peripheral rotor 5 in the embodiments), which has permanent magnets (e.g., permanent magnets 9 in the embodiments) arranged along a circumference thereof, and is arranged on an outer periphery of the inner-peripheral rotor in a manner such that the outer-peripheral rotor is coaxial and relatively rotatable with respect to the inner-peripheral rotor; and a phase varying device (e.g., a phase varying device 12 in the embodiments) for relatively rotating the inner-peripheral rotor and the outer-peripheral rotor so as to vary a relative phase between thereof, wherein the phase varying device includes:

a forward-angle working chamber (e.g., a forward-angle working chamber 24 in the embodiments) for relatively rotating the inner-peripheral rotor in a forward-angle direction with respect to the outer-peripheral rotor, by using pressure of a working fluid supplied to the forward-angle working chamber;

a backward-angle working chamber (e.g., a backward-angle working chamber 25 in the embodiments) for relatively rotating the inner-peripheral rotor in a backward-angle direction with respect to the outer-peripheral rotor, by using pressure of a working fluid supplied to the backward-angle working chamber;

a fluid supply source (e.g., an oil pump 32 in the embodiments) for supplying each working fluid;

a passage switching valve (e.g., a passage switching valve 37 in the embodiments) having a spur, for performing distribution with respect to a process of supply and drainage of the working fluid between the forward-angle working chamber and the backward-angle working chamber, in accordance with a position of the spur; and an electromagnetic pressure control valve (e.g., a pressure control valve 39 in the embodiments) for controlling pressure of the working fluid supplied from the fluid supply source, and controlling the position of the spur in the passage switching valve based on the controlled pressure of the working fluid.

In the above structure, the working fluid supplied from the fluid supply source is introduced into one of the forward-angle working chamber and the backward-angle working chamber in accordance with the position of the spur in the passage switching valve, so that the inner-peripheral rotor is relatively rotated forward or backward with respect to the outer-peripheral rotor. The electromagnetic pressure control valve, which may receive a command from a controller, appropriately controls the pressure of the working fluid supplied from the fluid supply source, so as to control the position of the spur of the passage switching valve by applying the controlled pressure of the working fluid to the spur. Accordingly, the spur of the passage switching valve is moved forward or backward by using a relatively high pressure of the working fluid; thus, the amount of supplied and drained working fluid with respect to the forward-angle working chamber and the backward-angle working chamber can be sufficiently increased. In addition, the process of supply and drainage of the working fluid between the forward-angle working chamber and the backward-angle working chamber is performed via the spur of the common passage switching valve.

That is, in accordance with the above structure, the relative phase between the outer-peripheral rotor and the inner-peripheral rotor is varied by appropriately performing the supply and drainage of the working fluid between the forward-angle working chamber and the backward-angle working chamber. In addition, the passage switching valve having the spur performs distribution with respect to the supply and drainage of the working fluid between the forward-angle working chamber and the backward-angle working chamber. Additionally, the electromagnetic pressure control valve controls the pressure of the working fluid supplied from the fluid supply source, and controls the position of the spur of the passage switching valve by using the controlled pressure of the working fluid. Therefore, a large amount of working fluid can be supplied without employing a large-sized electromagnetic valve, so that the relative phase between the outer-peripheral rotor and the inner-peripheral rotor can be voluntarily varied. In addition, the process of supply and drainage of the working fluid between the forward-angle working chamber and the backward-angle working chamber is performed using the spur of the common passage switching valve. Thus, a single passage switching valve and a single pressure control valve for controlling the position of the spur in the passage switching valve are necessary, thereby reducing the number of parts in the whole motor. Therefore, it is possible to prevent the manufacturing cost from increasing, and to improve the degree of freedom in the control for varying the relative phase.

In a typical example, the passage switching valve has:

a forward-angle feedback chamber (e.g., a forward-angle feedback chamber 62 in the embodiments) which communicates with the forward-angle working chamber, and applies thrust to the spur (e.g., a spur 38 in the embodiments), the thrust corresponding to pressure in the forward-angle working chamber; and a backward-angle feedback chamber (e.g., a backward-angle feedback chamber 63 in the embodiments) which communicates with the backward-angle working chamber, and applies thrust to the spur, the thrust corresponding to pressure in the backward-angle working chamber; and in the spur, the area of a pressure-receiving face which contacts the forward-angle feedback chamber is identical to the area of a pressure-receiving face which contacts the backward-angle feedback chamber.

In this case, thrust in accordance with a pressure difference between the forward-angle working chamber and the backward-angle working chamber is applied to the spur, and functions as force which balances with the spur control pressure (controlled by the pressure control valve). Therefore, it is possible to control the pressure difference between the forward-angle working chamber and the backward-angle working chamber by controlling the spur control pressure using the pressure control valve. In addition, if the pressure difference between the forward-angle working chamber and the backward-angle working chamber varies due to a disturbance while the control using the pressure control valve is maintained in a constant state, the pressure difference between the forward-angle working chamber and the backward-angle working chamber is automatically corrected so as to balance the thrust of the spur in accordance with the pressure difference between both working chambers with the force due to the spur control pressure.

Also in this case, the passage switching valve has the forward-angle feedback chamber and the backward-angle feedback chamber, and in the spur, the area of the pressure-receiving face which contacts the forward-angle feedback chamber is identical to the area of the pressure-receiving face which contacts the backward-angle feedback chamber. Therefore, the pressure difference between the forward-angle working chamber and the backward-angle working chamber can be controlled by means of the pressure control using the electromagnetic pressure control valve. Accordingly, when rotational reactive force generated in relative rotation between the inner-peripheral rotor and the outer-peripheral rotor varies linearly due to specific setting, the rotors can be accurately rotated and set to desired relative positions between the most backward-angle position and the most forward-angle position, without performing feedback control with respect to the relative positions of the inner-peripheral rotor and the outer-peripheral rotor.

Additionally, as described above, relative rotation between the rotors due to a disturbance is automatically corrected when the control using the pressure control valve is maintained in a constant state, or the like. Therefore, it is possible to simplify the control of the electromagnetic pressure control valve.

In another typical example, the motor may further comprise:

a regulator valve (e.g., a regulator valve 35 in the embodiments) having:

a control spur (e.g., a control spur 41 in the embodiments) which moves forward or backward in accordance with balance between force generated by a spring and the pressure of the fluid supplied by the fluid supply source, wherein pressure in a line passage (e.g., a line passage 33 in the embodiment), which communicates with the passage switching valve, is controlled in accordance with a position of the control spur; and a reactive-force control chamber (e.g., a reactive-force control chamber 47 in the embodiments) for applying the pressure of the working fluid, which is controlled by the electromagnetic pressure control valve, to the control spur in a direction identical to that in which the force of the spring acts.

In this case, the pressure of the working fluid, controlled by the electromagnetic pressure control valve, is applied to the control spur, as reactive force applying in the same direction as the pushing direction of force generated by the spring, and the pressure control of the line passage using the regulator valve is performed in accordance with the spur control pressure of the passage switching valve. Therefore, in forward rotation, if it is predetermined that the reactive force in the rotation direction increases substantially linearly due to reactive force of the permanent magnets of the rotors or by using another forcing means, the spur control pressure of the passage switching valve is increased so as to rotate the inner-peripheral rotor forward with respect to the outer-peripheral rotor. Accordingly, the pressure of the line passage is increased via the regulator valve, thereby reliably rotating the inner-peripheral rotor forward.

That is, when it is predetermined that the rotational reactive force increases substantially linearly in accordance with progress in the phase variation due to an increase in the spur control pressure of the passage switching valve, the phase can be reliably varied by means of pressure through the line passage, which corresponds to the rotational reactive force. Therefore, the pressure of the line passage is automatically controlled in accordance with the rotational reactive force, and thus it is unnecessary to always set the pressure of the line passage to a large value, thereby allowing decrease in energy loss.

In a preferable example, an introduction space (e.g., an introduction space 23 in the embodiments), to which a working fluid can be supplied, is provided between a first member (e.g., a vane rotor 14 and drive plates 16 in the embodiments), which rotates integrally with the outer-peripheral rotor, and a second member (e.g., a circular housing 15 in the embodiments), which rotates integrally with the inner-peripheral rotor;

a vane (e.g., a vane 18 in the embodiments) for dividing the introduction space into two chambers protrudes into the introduction space in a freely slidable manner from one of the first member and the second member; and the two chambers divided by the vane function as the forward-angle working chamber and the backward-angle working chamber.

In this case, when the working fluid is supplied to the forward-angle working chamber and it is drained from the backward-angle working chamber, the vane receives differential pressure between front and back chambers thereof, so that it relatively moves from one side to the other side in the introduction space, and the first member and the second member rotate in a relative rotation direction. Accordingly, the inner-peripheral rotor relatively rotates forward with respect to the outer-peripheral rotor. In contrast, when the working fluid is supplied to the backward-angle working chamber and it is drained from the forward-angle working chamber, the vane also receives differential pressure between front and back chambers thereof, so that it relatively moves in a direction opposite to that in the above case, and the inner-peripheral rotor relatively rotates backward with respect to the outer-peripheral rotor, via the first member and the second member.

In another preferable example, a shaft part (e.g., a shaft part 112b in the embodiments) is provided at one of a first member (e.g., an inner cylindrical member 112 and drive plates 114 in the embodiments), which rotates integrally with the outer-peripheral rotor, and a second member (e.g., an outer cylindrical member 113 in the embodiments), which rotates integrally with the inner-peripheral rotor;

a cylindrical part (e.g., a thicker part 113a in the embodiments) for surrounding an outer side of the shaft part is provided at the other of the first member and the second member;

a ring gear (e.g., a ring gear 118 in the embodiments) is provided, an inner-peripheral face and an outer-peripheral face of which respectively engage with the shaft part and the cylindrical part via helical splines;

an introduction space (e.g., an introduction space 115 in the embodiments), to which a working fluid can be supplied, is provided between the first member and the second member;

a piston (e.g., a piston 122 in the embodiments) for dividing the introduction space into two chambers is contained in the introduction space in a freely slidable manner, and is coupled with the ring gear in a manner such that the piston is movable integrally with the ring gear; and the two chambers divided by the piston function as the forward-angle working chamber and the backward-angle working chamber.

In this case, when the working fluid is supplied to the forward-angle working chamber and it is drained from the backward-angle working chamber, the piston receives differential pressure between front and back chambers thereof, so that it relatively moves from one side to the other side in the introduction space. In this process, the ring gear coupled with the piston moves from one side to the other side between the shaft part and the cylindrical part, so that the ring gear applies relative rotation force (in a relative rotation direction) to the shaft part and the cylindrical part via the helical splines. Accordingly, the first member and the second member rotate in a relative rotation direction, and the inner-peripheral rotor relatively rotates forward with respect to the outer-peripheral rotor. In contrast, when the working fluid is supplied to the backward-angle working chamber and it is drained from the forward-angle working chamber, the piston receives differential pressure between front and back chambers thereof, so that it relatively moves in a direction opposite to that in the above case, and the ring gear moves in the same direction as that of the movement of the piston. Accordingly, the ring gear applies relative rotation force (in a direction opposite to that in the above case) to the shaft part and the cylindrical part via the helical splines. Accordingly, the first member and the second member rotate in the other relative rotation direction, and the inner-peripheral rotor relatively rotates backward with respect to the outer-peripheral rotor.

In another preferable example, a first cylinder (e.g., a first cylinder 214 in the embodiments) and a second cylinder (e.g., a second cylinder 215 in the embodiments) are provided at one of a first member (e.g., an inner block 212 in the embodiments), which rotates integrally with the outer-peripheral rotor, and a second member (e.g., an outer block 213 in the embodiments), which rotates integrally with the inner-peripheral rotor, wherein the first and second cylinders are arranged in substantially tangential directions with respect to a circumference around a rotation axis of the rotors as the center thereof, and are open toward opposite rotation directions;

a first piston (e.g., a first piston 216 in the embodiments) and a second piston (e.g., a second piston 217 in the embodiments) are respectively inserted into the first cylinder and a second cylinder in a freely slidable manner;

a first load-transmitting wall (e.g., a first load-transmitting wall 218 in the embodiments) and a second load-transmitting wall (e.g., a second load-transmitting wall 219 in the embodiments) are provided at the other of the first member and the second member, wherein the first load-transmitting wall and the second load-transmitting wall are arranged along substantially radial directions of the rotors, and respectively contact head parts of the first piston and the second piston; and a space between the first cylinder and the first piston and a space between the second cylinder and the second piston respectively function as the forward-angle working chamber and the backward-angle working chamber.

In this case, when the working fluid is supplied to the forward-angle working chamber and it is drained from the backward-angle working chamber, the first piston protrudes while the second piston withdraws. In this process, the first piston pushes the first load-transmitting wall, so that the first load-transmitting wall moves away from the first cylinder, and simultaneously, the second load-transmitting wall approaches the second cylinder. Accordingly, the first member and the second member rotate in a relative rotation direction, and the inner-peripheral rotor relatively rotates forward with respect to the outer-peripheral rotor. In contrast, when the working fluid is supplied to the backward-angle working chamber and it is drained from the forward-angle working chamber, the second piston protrudes while the first piston withdraws, so that the second piston pushes the second load-transmitting wall. Accordingly, the first member and the second member rotate in the other relative rotation direction, and the inner-peripheral rotor relatively rotates backward with respect to the outer-peripheral rotor.

The above preferable examples each employ a simple structure, in which the relative phase between the inner-peripheral rotor and the outer-peripheral rotor can be accurately varied at any timing by means of supply control of the working fluid. Therefore, it is possible to improve flexibility in the degree of freedom with respect to the control of varying the relative phase, and to reduce the size of the motor.

DETAILED DESCRIPTION OF THE INVENTION

Hereinafter, embodiments in accordance with the present invention will be described with reference to the appended figures.

A first embodiment will be explained with reference to FIGS. 1 to 12.

Figure 1:
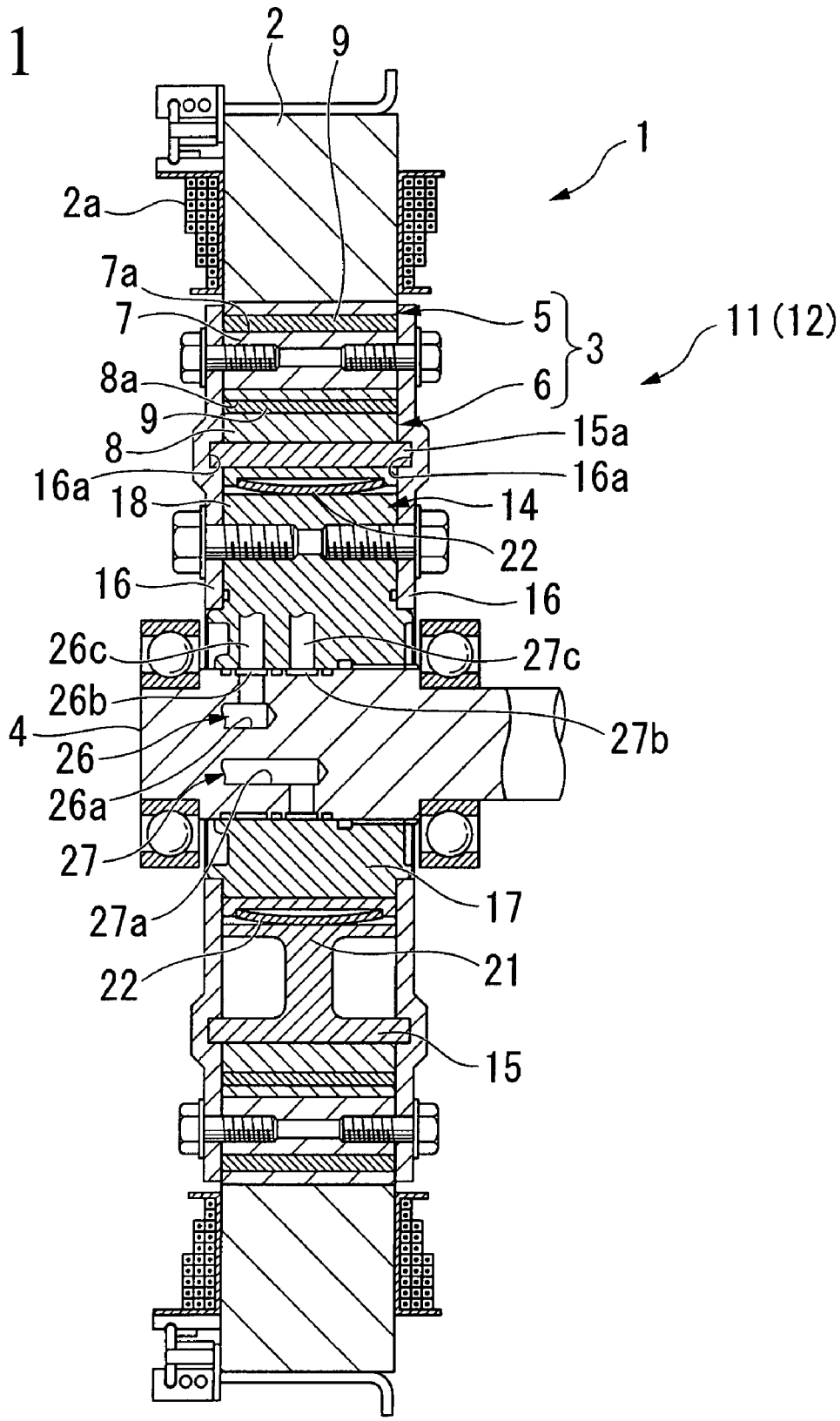
FIG. 1 is a sectional view of main parts of a motor as a first embodiment in accordance with the present invention.
Figure 2:
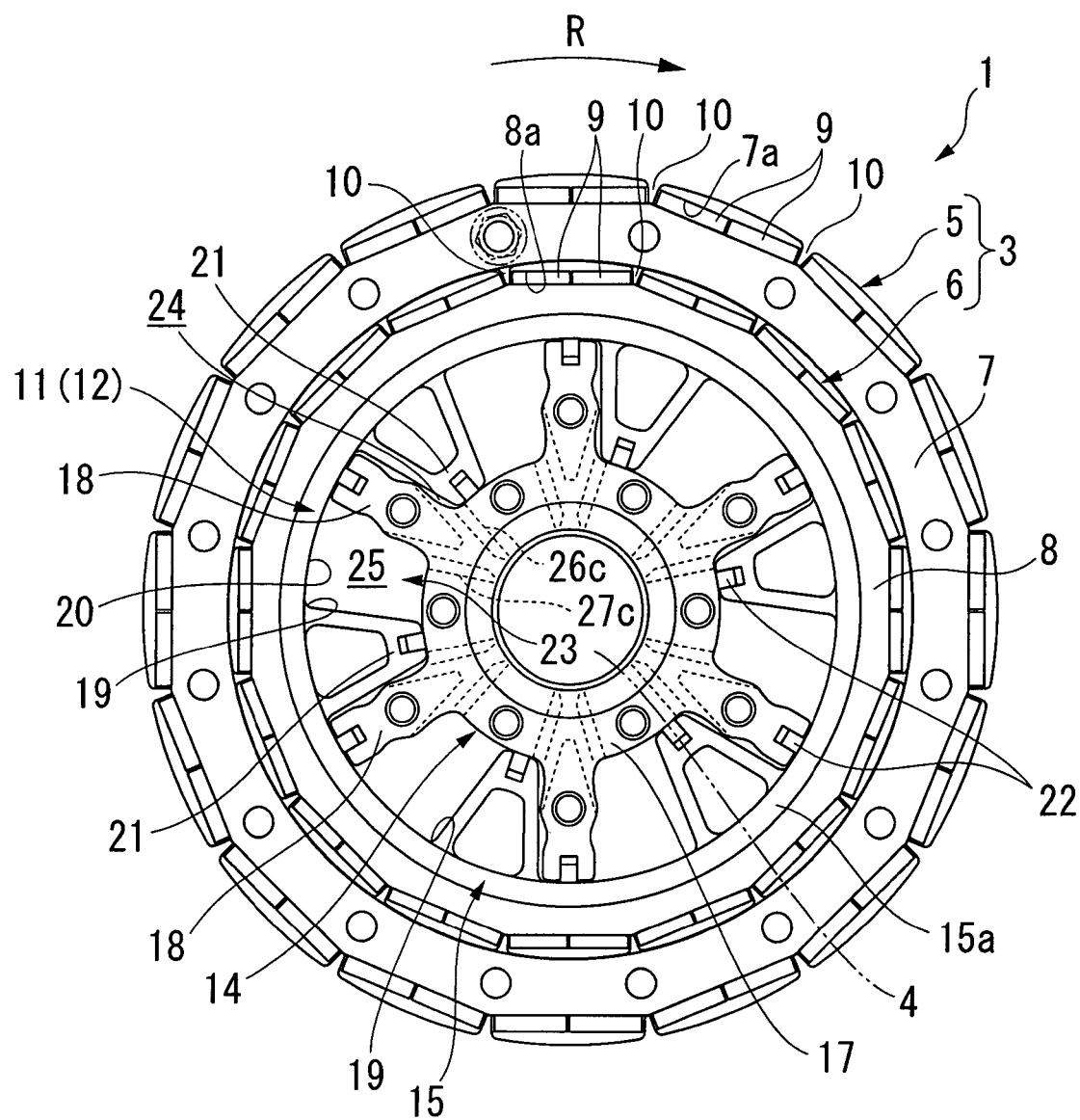
FIG. 2 is a side view (in which some parts are omitted) showing a rotor unit of the motor of the first embodiment, which is controlled to stay at the most backward-angle position.
Figure 3:
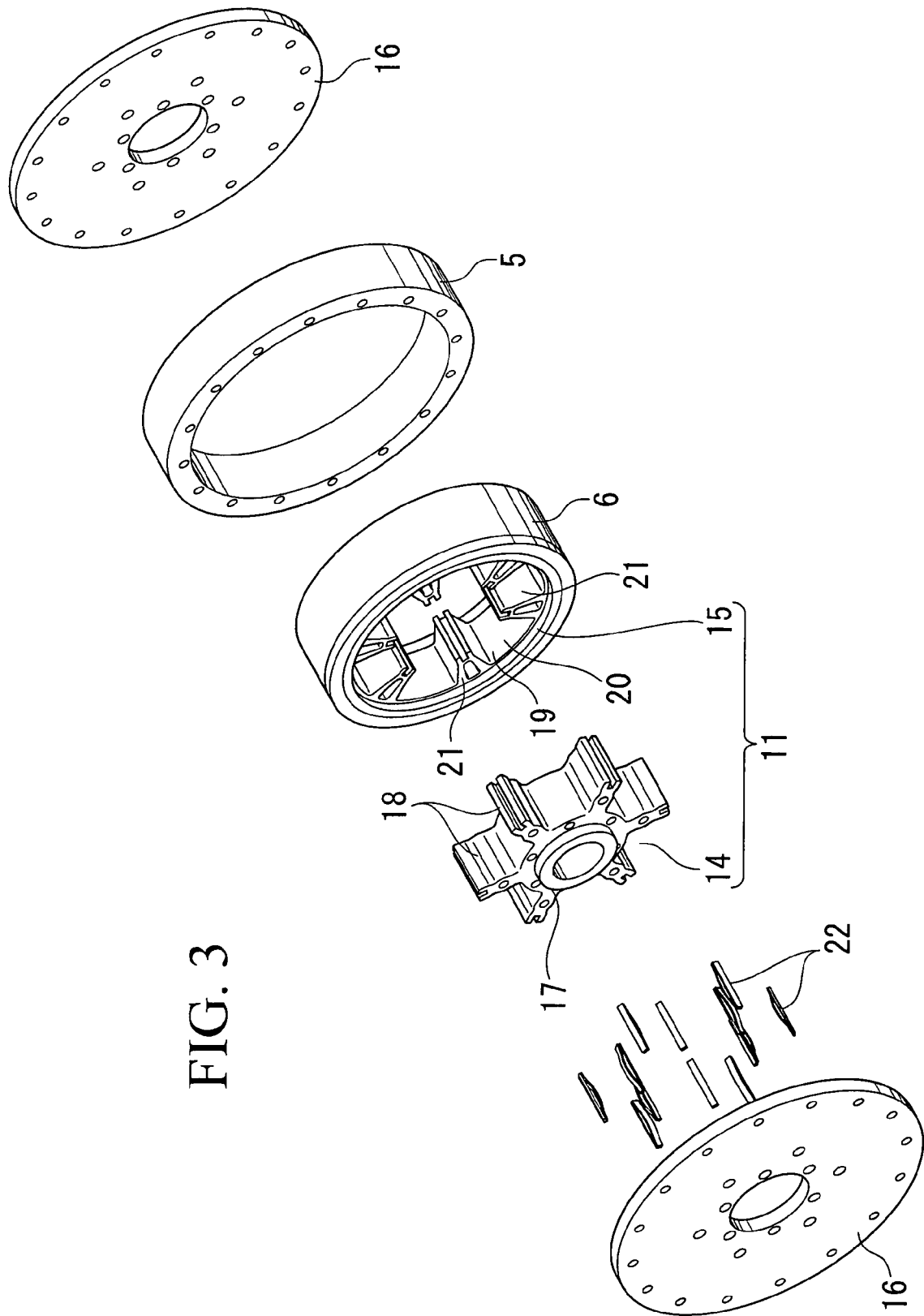
FIG. 3 is an exploded perspective view showing the rotor unit of the motor in the first embodiment.
Figure 4:
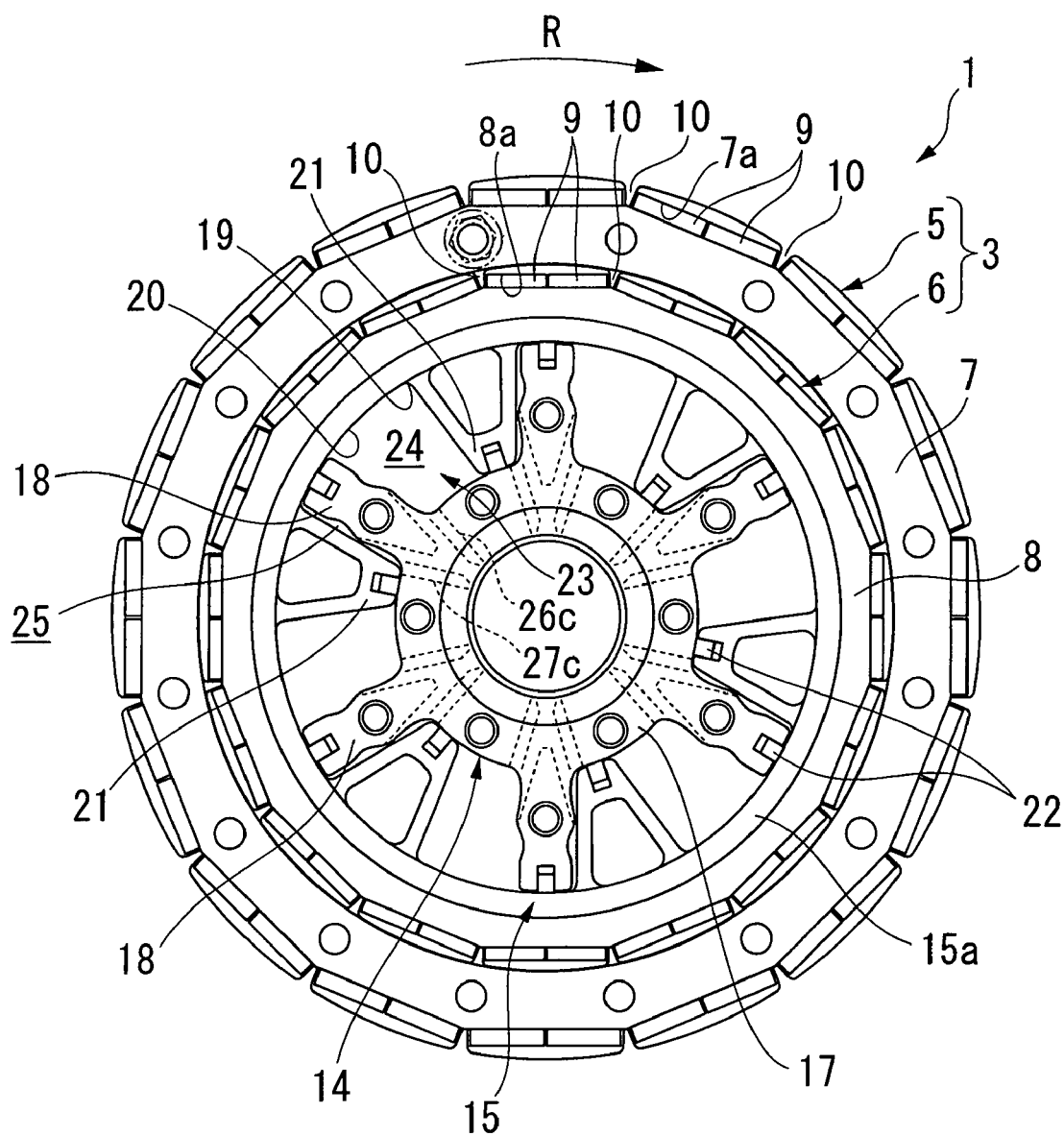
FIG. 4 is a side view (in which some parts are omitted) showing the rotor unit, which is controlled to stay at the most forward-angle position.

FIG. 1 is a sectional view of main parts of a motor 1 of the first embodiment. FIG. 2 is a side view (in which some parts are omitted) showing a rotor unit of the motor, which is controlled to stay at the most backward-angle position. FIG. 3 is an exploded perspective view showing the rotor unit of the motor. FIG. 4 is a side view showing the rotor unit, which is controlled to stay at the most forward-angle position.

As shown in FIGS. 1 to 4, the motor 1 is a blushless DC motor of an inner rotor type, in which a rotor unit 3 is arranged on the inner-peripheral side of a circular stator 2. The motor 1 may be used as a driving source for running a hybrid vehicle, a motor-driven vehicle, or the like. The stator 2 has stator windings 2a having different phases. The rotor unit 3 has a rotating shaft 4 on the axial center thereof.

When using the motor 1 as the driving source for running a vehicle, the rotational force of the motor 1 is transmitted via a transmission (not shown) to driving wheels (not shown) of the vehicle. In this case, when the motor 1 functions as a generator during deceleration of the vehicle, generated power can be stored in a battery as regenerative energy. Additionally, in a hybrid vehicle, the rotating shaft 4 of the motor 1 may be coupled to a crank shaft (not shown) of an internal combustion engine, so that the motor 1 can be used for generating power via the internal combustion engine.

The rotator unit 3 has an outer-peripheral rotor 5 having a circular form, and an inner-peripheral rotor 6 which also has a circular form and is arranged coaxially on the inner side of the outer-peripheral rotor 5. The outer-peripheral rotor 5 and the inner-peripheral rotor 6 can rotate within a predetermined angle.

In the outer-peripheral rotor 5, a rotor iron-core 7 having a circular form is provided as a rotor main body, which may be made of sintered metal. In the rotor iron-core 7, a plurality of magnet mounting slots 7a are arranged in a circumferential direction at regular intervals, where the slot arrangement position is closer to the outer periphery of the rotor iron-core 7. Similarly, in the inner-peripheral rotor 6, a rotor iron-core 8 having a circular form is provided as a rotor main body, which may be made of sintered metal. Also in the rotor iron-core 8, a plurality of magnet mounting slots 8a are arranged in a circumferential direction at regular intervals, where the slot arrangement position is closer to the outer periphery of the rotor iron-core 8.

In each of the magnet mounting slots 7a and 8a, two permanent magnets 9, each having a plate shape and being magnetized in the thickness direction thereof, are mounted in a parallel form. The two permanent magnets 9 installed in the same slot (7a or 8a) are magnetized in the same direction, and the pairs of the permanent magnets installed in adjacent slots have different polar directions. That is, in the rotors 5 and 6, a pair of the permanent magnets 9, having an N-pole on the outer-peripheral side, and a pair of the permanent magnets 9, having an S-pole on the outer-peripheral side are alternately arranged in the circumferential direction. In addition, a notch 10 is formed between adjacent magnet-mounting slots (7a or 8b), along the axial direction of the rotors 5 and 6, so as to control the flow of the magnetic flux of the relevant permanent magnets 9.

Figure 5A:
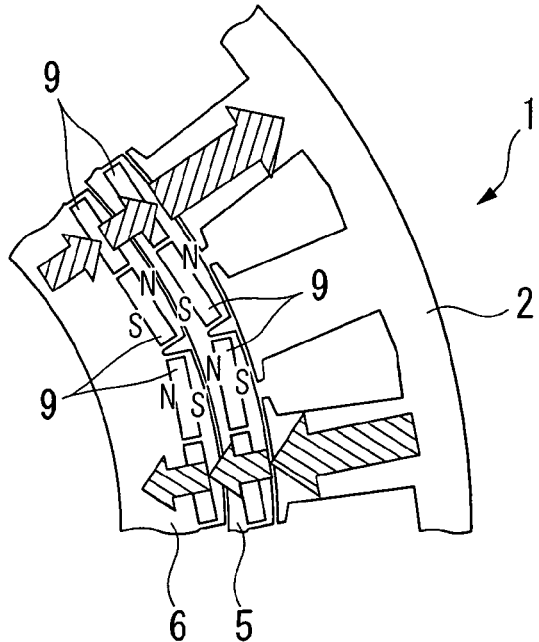
FIG. 5A is a diagram explaining a strengthened magnetic field generated when the permanent magnets of the inner-peripheral rotor and the outer-peripheral rotor have the same pole-position setting.
Figure 5B:
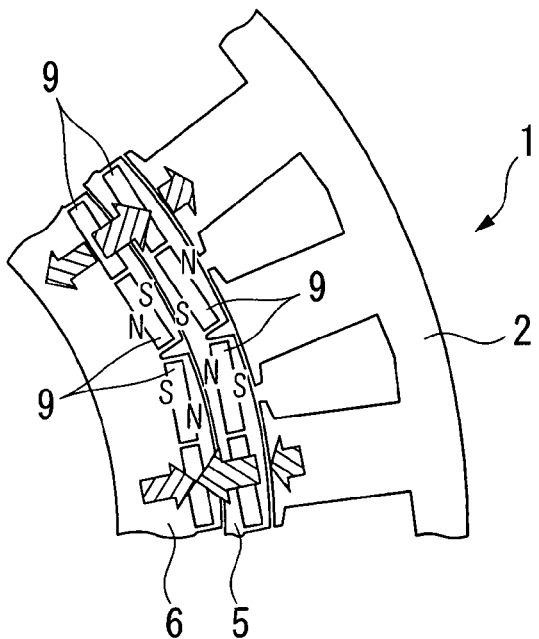
FIG. 5B is a diagram explaining a weakened magnetic field generated when the permanent magnets of the inner-peripheral rotor and the outer-peripheral rotor have opposite pole-position settings.

FIG. 5A is a diagram explaining a strengthened magnetic field generated when the permanent magnets of the inner-peripheral rotor and the outer-peripheral rotor have the same pole-position setting, and FIG. 5B is a diagram explaining a weakened magnetic field generated when the permanent magnets of the inner-peripheral rotor and the outer-peripheral rotor have opposite pole-position settings.

The outer-peripheral rotor 5 and the inner-peripheral rotor 6 each have the same number of the magnet-mounting slots (7a or 8b), so that the permanent magnets 9 of the outer-peripheral rotor 5 and the inner-peripheral rotor 6 have one-to-one correspondence to each other. Therefore, when each pair of the permanent magnets 9 belonging to the outer-peripheral rotor 5 is made to face a pair of the permanent magnets 9 belonging to the inner-peripheral rotor 6 in a manner such that the same poles (i.e., N-poles or S-poles) face each other (i.e., providing opposite pole-position settings), the whole rotor unit 3 can have the weakest magnetic field (i.e., a weakened magnetic field, see FIGS. 4 and 5B). In contrast to this, when each pair of the permanent magnets 9 belonging to the outer-peripheral rotor 5 is made to face a pair of the permanent magnets 9 belonging to the inner-peripheral rotor 6 in a manner such that opposite poles (i.e., N-pole and S-pole) face each other (i.e., providing the same pole-position setting), the whole rotor unit 3 can have the strongest magnetic field (i.e., a strengthened magnetic field, see FIGS. 2 and 5A).

Figure 6:
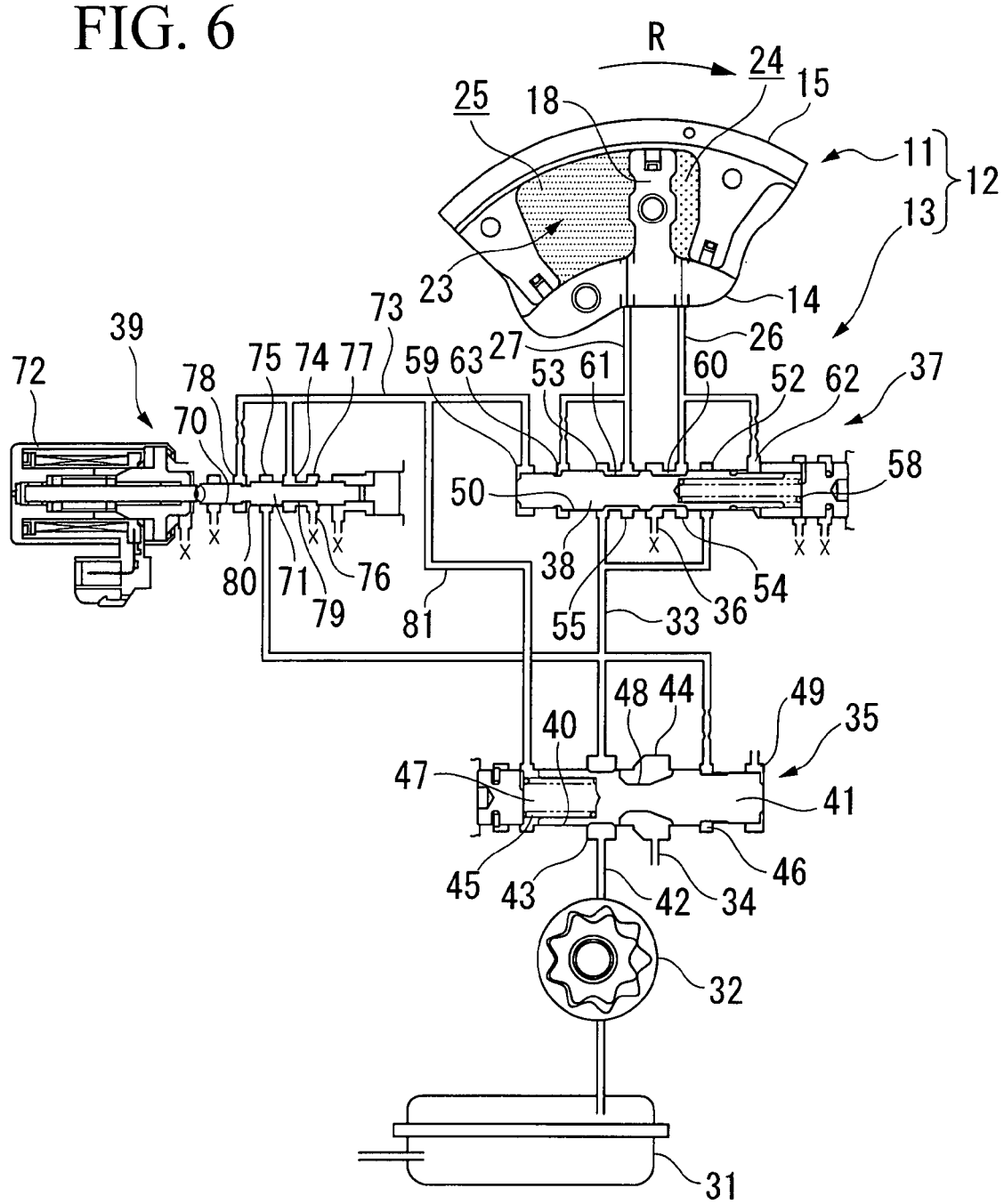
FIG. 6 shows an oil-pressure circuit which mainly has the oil-pressure control device in the phase varying device of the first embodiment.

The rotor unit 3 also has a rotation mechanism 11 for relatively rotating the outer-peripheral rotor 5 and the inner-peripheral rotor 6. The rotation mechanism 11 functions as a part of a phase varying device 12 for freely varying the relative phase between the rotors 5 and 6, and is operated by a pressure of a working liquid, which is an incompressible working fluid. The rotation mechanism 11, and an oil-pressure control device 13 (see FIG. 6) for controlling the pressure of the working liquid supplied to the rotation mechanism 11 are main structural elements of the phase varying device 12. FIG. 6 shows an oil-pressure circuit which mainly has the oil-pressure control device 13.

As shown in FIGS. 1 to 3, the rotation mechanism 11 has (i) a vane rotor 14 (i.e., a first member) which is fit around the rotating shaft 4 via formed splines in a manner such that it is rotatable together with the rotating shaft 4, and (ii) a circular housing 15 (i.e., a second member) which is arranged on the outer periphery of the vane rotor 14 in a manner such that the circular housing 15 and the vane rotor 14 can be relatively rotated. The circular housing 15 is integrally fastened to the inner-peripheral face of the inner-peripheral rotor 6, and the vane rotor 14 is integrally coupled to the outer-peripheral rotor 5 via a pair of disk-shaped drive plates 16 (also as the first member), each striding over side ends of the circular housing 15 and the inner-peripheral rotor 6. Therefore, the vane rotor 14, the rotating shaft 4, and the outer-peripheral rotor 5 form an integral part, while the circular housing 15 and the inner-peripheral rotor 6 also form an integral part.

The vane rotor 14 has a boss part 17, which has a cylindrical shape and is fit around the rotating shaft 4 via splines. On the outer periphery of the boss part 17, a plurality of vanes 18, each protruding outward in a radial direction, are arranged at regular intervals in a circumferential direction. On the other hand, on the inner periphery of the circular housing 15, a plurality of recessed parts 19 are provided at regular intervals in a circumferential direction. Each recessed part 19 is formed by (i) a bottom wall 20 having an arc shape which substantially conforms to the rotation track followed by the head of the corresponding vane 18, and (ii) partition walls 21, each having a triangular shape and separating adjacent recessed parts 19. When the vane rotor 14 and the circular housing 15 relatively rotate, each vane 18 can be displaced between one and the other partition walls 21 (i.e., adjacent partition walls 21) which interpose the vane 18.

In the present embodiment, when each partition wall 21 contacts the corresponding vane 18, it functions as a stopper for restricting the relative rotation between the vane rotor 14 and the circular housing 15. In addition, a seal member 22 is provided along the axial direction to each head of the vanes 18 and the partition walls 21, so that the part between each vane 18 and the corresponding bottom wall 20 of the recessed part 19, and the part between each partition wall 21 and the outer-peripheral face of the boss part 17 are each sealed in a liquid-resistant state.

The circular housing 15 has a base part 15a fastened to the inner-peripheral rotor 6. The base part 15a has a cylindrical shape having a constant thickness, and protrudes outward along the axial direction, in comparison with the inner-peripheral rotor 6 and the partition walls 21 (see FIG. 1). Each end of the protruding portions of the base part 15a is fit into a circular guide groove 16a (formed in the corresponding drive plate 16) in a freely slidable manner, so that the circular housing 15 and the inner-peripheral rotor 6 are supported by the outer-peripheral rotor 5 and the rotating shaft 4 in a floating state.

The drive plates 16, provided on both sides of (the set of) the outer-peripheral rotor 5 and the vane rotor 14 so as to couple them, closely contact both side faces (i.e., both end faces in the axial direction) of the circular housing 15 in a freely slidable manner, so that they close each side of the recessed parts 19 in the circular housing 15. Therefore, each recessed part 19 forms an independent space surrounded by the boss part 17 and the drive plates 16 on both sides of the recessed part 19. This space functions as an introduction space 23 to which a working liquid is introduced. Each introduction space 23 is divided into two chamber by the corresponding vane 18 of the vane rotor 14: one is a forward-angle working chamber 24, and the other is a backward-angle working chamber 25.

The forward-angle working chamber 24 relatively rotates the inner-peripheral rotor 6 with respect to the outer-peripheral rotor 5 in a forward-angle direction, by using the pressure of the working liquid which is introduced into the chamber, while the backward-angle working chamber 25 relatively rotates the inner-peripheral rotor 6 with respect to the outer-peripheral rotor 5 in a backward-angle direction, by using the pressure of the working liquid which is introduced into this chamber. The above "forward-angle" corresponds to a movement of the inner-peripheral rotor 6 (with respect to the outer-peripheral rotor 5) in the rotation direction R (see FIGS. 2 and 4) of the motor 1, and the "backward-angle" corresponds to a movement of the inner-peripheral rotor 6 (with respect to the outer-peripheral rotor 5) in the reverse direction with respect to the rotation direction R.

Supply and drainage of the working liquid to each forward-angle working chamber 24 and each backward-angle working chamber 25 are performed via the rotating shaft 4. More specifically, each forward-angle working chamber 24 is connected to a forward-angle supply and drainage passage 26 of the oil-pressure control device 13 (see FIG. 6), and each backward-angle working chamber 25 is connected to a backward-angle supply and drainage passage 27 of the oil-pressure control device 13. As shown in FIG. 1, part of the forward-angle supply and drainage passage 26 and part of the backward-angle working chamber 25 are respectively formed by passage openings 26a and 27a, which are each formed in the rotating shaft 4 along the axial direction thereof. Ends of the passage openings 26a and 27a are respectively connected to circular grooves 26b and 27b formed on the outer-peripheral face of the rotating shaft 4, where the positions of the circular grooves 26b and 26c are offset (to the left side in FIG. 1) in the axial direction. The circular grooves 26b and 26c are respectively connected to introduction holes 26c and introduction holes 27c, both of which are formed in the boss part 17 in substantially radial directions. Therefore, each introduction hole 26c connects the circular groove 26b to the corresponding forward-angle working chamber 24, and each introduction hole 27c connects the circular groove 27b to the corresponding backward-angle working chamber 25.

In the motor 1 of the present embodiment, when the inner-peripheral rotor 6 is set at the most backward-angle position with respect to the outer-peripheral rotor 5, the permanent magnets of the outer-peripheral rotor 5 and the inner-peripheral rotor 6 face each other in a manner such that opposite poles (i.e., N-pole and S-pole) also face each other, thereby generating a strengthened magnetic field (see FIGS. 2 and 5A). In contrast, when the inner-peripheral rotor 6 is set at the most forward-angle position with respect to the outer-peripheral rotor 5, the permanent magnets of the outer-peripheral rotor 5 and the inner-peripheral rotor 6 face each other in a manner such that the same poles (i.e., N-poles or S-poles) also face each other, thereby generating a weakened magnetic field (see FIGS. 4 and 5B).

In the motor 1, the magnetic field can be voluntarily switched between the strengthen state and the weakened state, by means of the supply and drainage control of the working liquid to and from the forward-angle working chambers 24 and the backward-angle working chambers 25. When the strength of the magnetic field is changed as described above, an induced voltage constant is also changed, so that the characteristics of the motor 1 are varied. That is, when the induced voltage constant is increased due to the strengthened magnetic field, a permissive rotation speed with respect to the operation of the motor 1 decreases; however, the maximum torque which can be output increases. In contrast, when the induced voltage constant is decreased due to the weakened magnetic field, the maximum torque which can be output decreases; however, the permissive rotation speed with respect to the operation of the motor 1 increases.

As shown in FIG. 6, the oil-pressure control device 13 has (i) an oil pump 32 for pumping up the working liquid in an oil tank 31, (ii) a regulator valve 35 for controlling the pressure of the working liquid drawn from the oil pump 32, introducing the controlled working liquid into a high-pressure line passage 33, and draining surplus working liquid to a low-pressure line passage 34, which is provided for lubricating or cooling various devices, (iii) a passage switching valve 37 of a spur type, for distributing the working liquid introduced into the line passage 33 into the forward-angle supply and drainage passage 26 and the backward-angle supply and drainage passage 27, and draining excess working liquid in the forward-angle supply and drainage passage 26 and the backward-angle supply and drainage passage 27 into a drain passage 36, and (iv) an electromagnetic pressure control valve 39 for controlling the pressure supplied through line passage 33 so as to control the position of a spur 38 of the passage switching valve 37.

Figure 10:
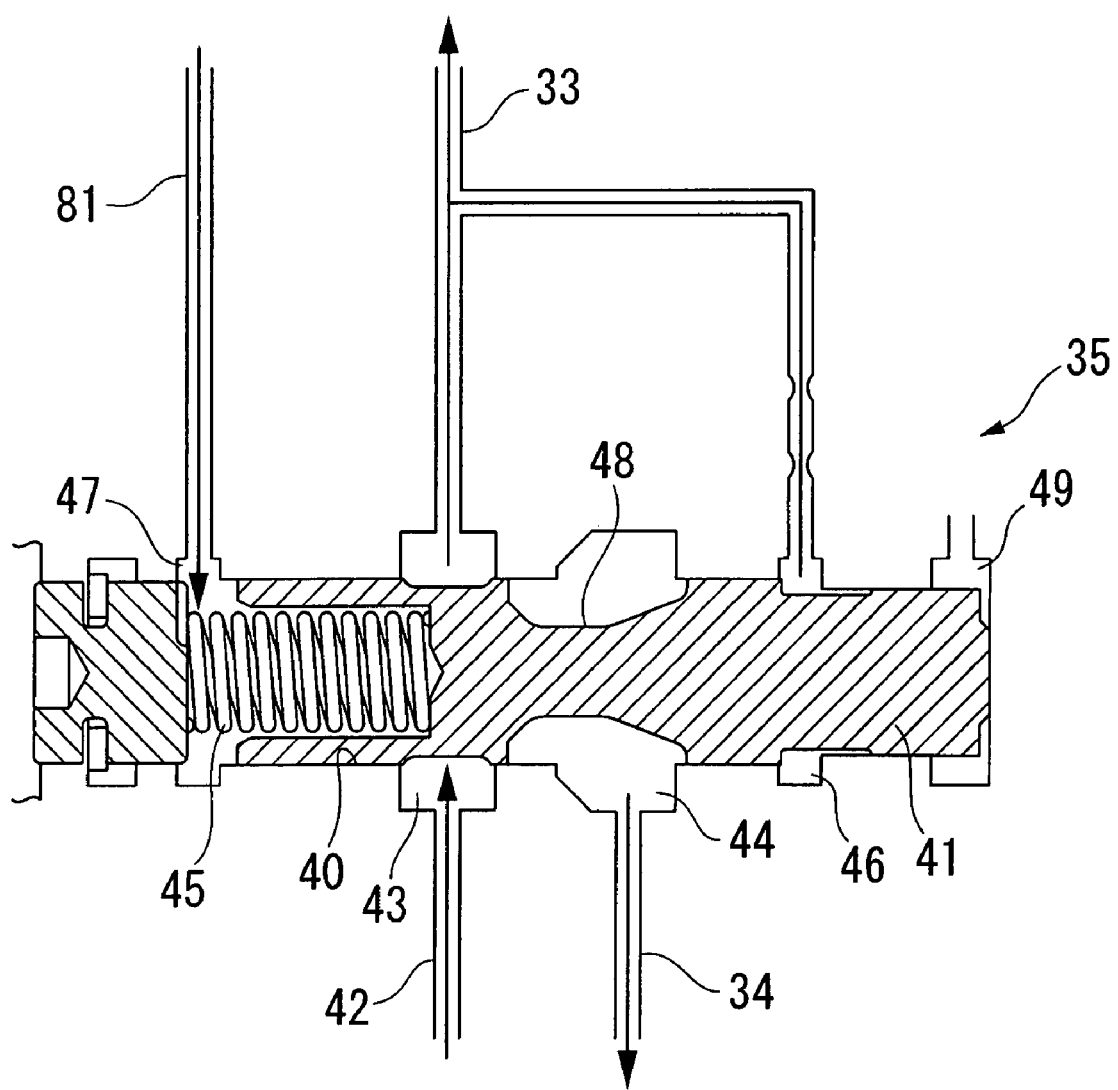
FIG. 10 is a schematic sectional view showing the regulator valve in the first embodiment.

FIG. 10 is a sectional view showing the general structure of the regulator valve 35. As shown in FIG. 10, the regulator valve 35 has (i) a control spur 41, which is contained in a valve container (or containing chamber) 40 in a freely slidable manner, (ii) a circular supply port 43 provided at the substantial center of the valve container 40, through the inner-peripheral face thereof, for making a pump passage 42 and the line passage 33 always communicate with each other, (iii) a circular drainage port 44 which is positioned adjacent to the circular supply port 43 in the valve container 40, and communicates with the low-pressure passage 34, (iv) a spring 45, provided on one end (on the left side in FIG. 10) of the valve container 40, for forcing the control spur 41 toward the other end (on the right side in FIG. 10), (v) a spur control chamber 46, positioned in the vicinity of the other end of the valve container 40, for applying the pressure obtained through the line passage 33 to the control spur 41 in the direction opposite to the force of the spring 45, and (vi) a reactive-force control chamber 47, which is provided at the end of the valve container 40 (where the spring 45 is contained), and to which an adjustment pressure (explained later) is supplied.

The control spur 41 has a drainage guide groove 48, which has a circular shape and is formed at the substantial center in the axial direction, through the outer-peripheral face thereof. The drainage guide groove 48 has a width striding over the supply port 43 and the drainage port 44 (which are provided at the valve container 40), so that surplus working liquid can be drained from the supply port 43 to the drainage port 44 (i.e., to the low-pressure passage 34) through the drainage guide groove 48.

In an initial state in which the pressure through the line passage 33 is low, the control spur 41 is forced by the spring 45, and is positioned closest to the other end (on the right side in FIG. 10), so that the drainage guide groove 48 obstructs communication between the supply port 43 and the drainage port 44. When the control spur 41 moves from this position toward the one end (i.e., the left side in FIG. 10) while opposing the pushing force of the spring 45, the area for communication between the supply port 43 and the drainage port 44 through the drainage guide groove 48 increases in accordance with the amount of movement of the control spur 41 (i.e., with the position of the control spur 41).

Basically, the position of the control spur 41 is controlled due to a balance between the pressure supplied through the line passage 33 to the spur control chamber 46, and the reactive force of the spring 45, and the pressure of the line passage 33 is controlled in accordance with the controlled position. However, an adjustment pressure (explained later) is appropriately supplied to the reactive-force control chamber 47 in accordance with the operation state of the motor 1. Therefore, when a pressure, which exceeds the atmospheric pressure, is supplied to the reactive-force control chamber 47, a reactive force generated by the adjustment pressure is added to the reactive force of the spring 45.

In FIGS. 6 and 10, reference numeral 49 indicates an atmospheric pressure port provided on the other end of the valve container 40.

Figure 7:
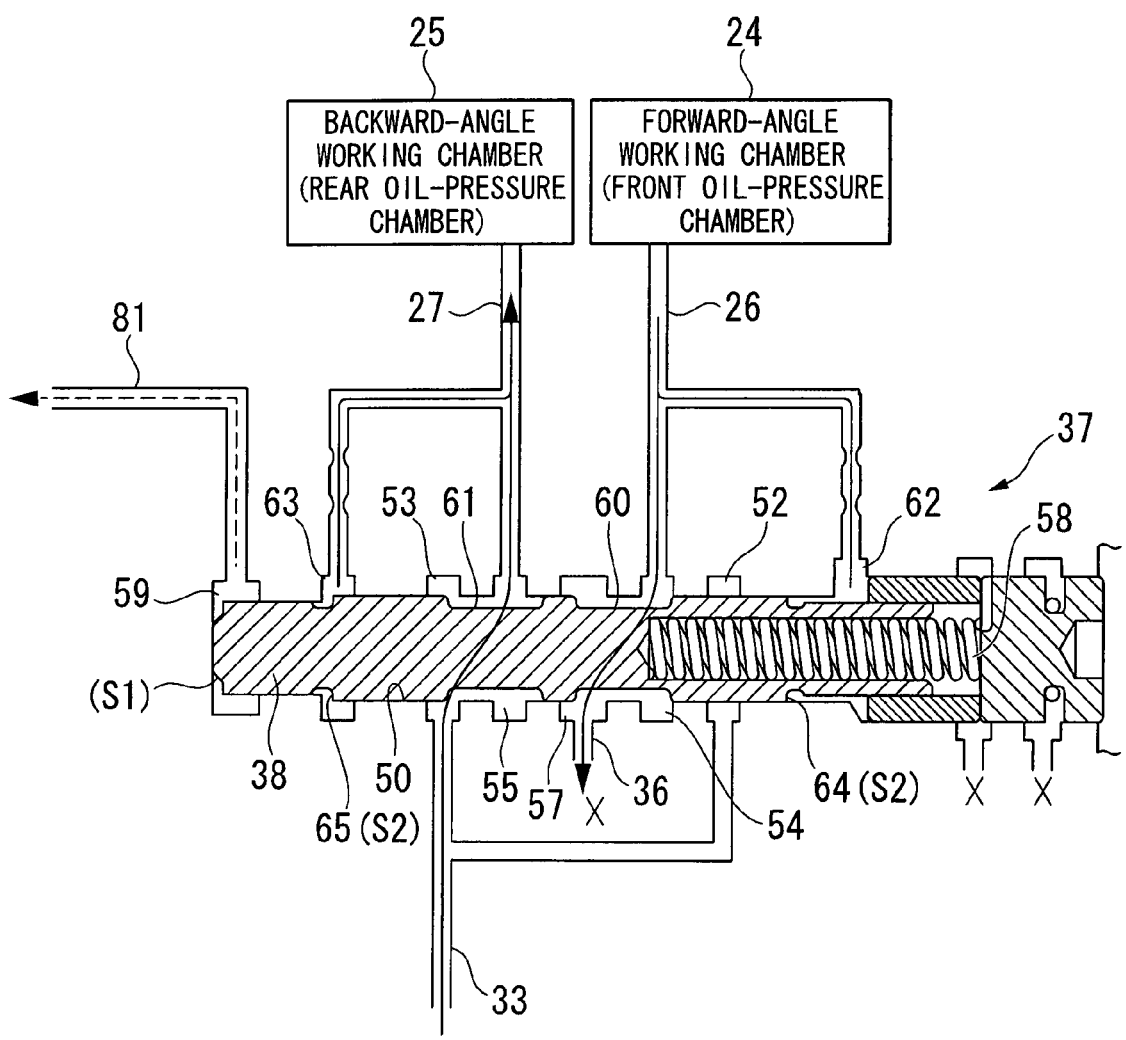
FIG. 7 is a schematic sectional view showing the passage switching valve in the first embodiment.
Figure 9:
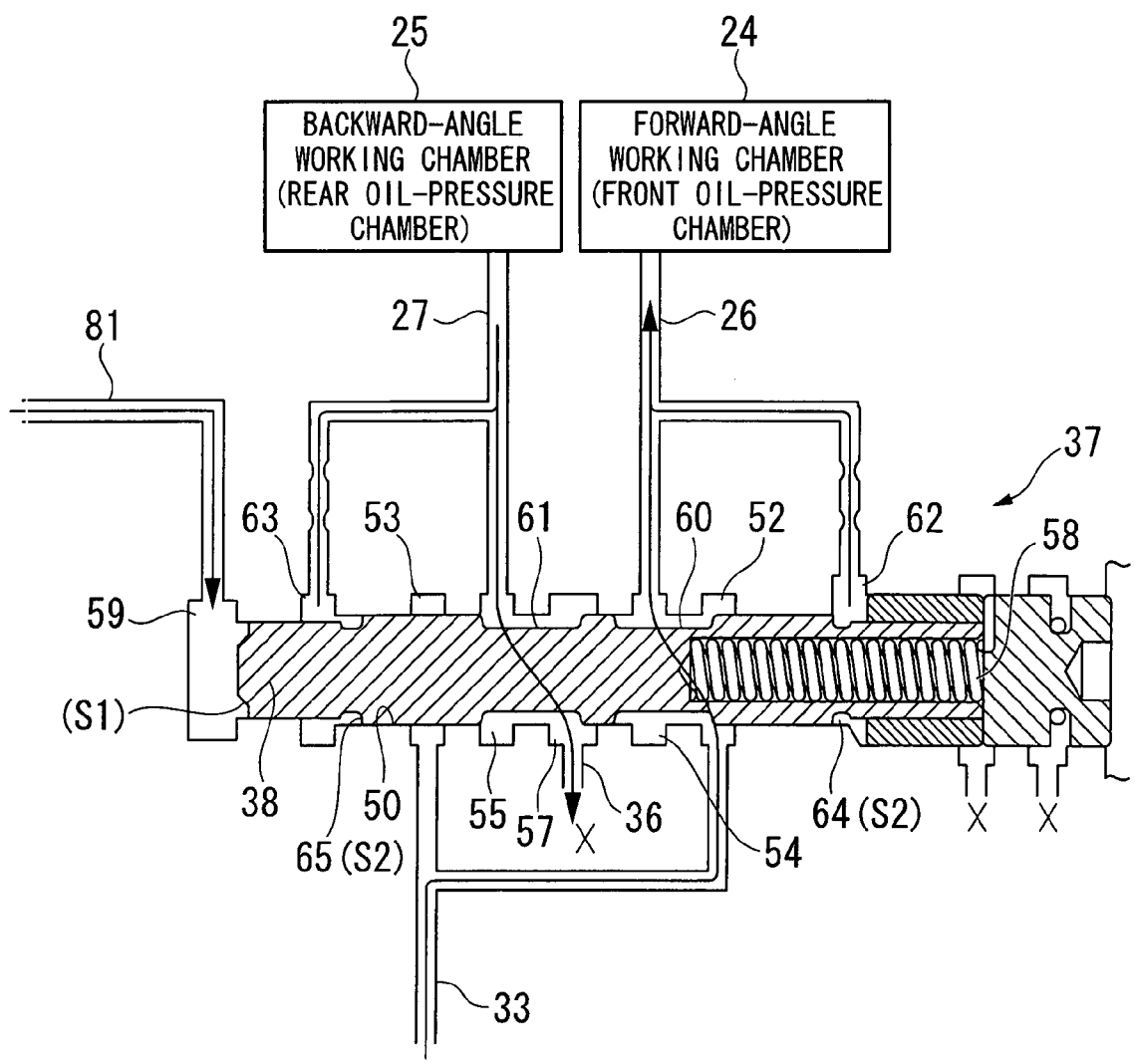
FIG. 9 is also a schematic sectional view showing the passage switching valve in the first embodiment.

FIGS. 7 and 9 are sectional views showing the passage switching valve 37. In these figures, the forward-angle working chamber 24 and the backward-angle working chamber 25 each are a collective form of the relevant chambers shown in FIG. 2 or 4.

As shown in FIGS. 7 and 9, the passage switching valve 37 has (i) a spur 38 contained in a valve container 50 in a freely slidable manner, (ii) a first introduction port 52 and a second introduction port 53, which are provided in the valve container 50 at separate positions in the axial direction thereof, and each of which communicates with the line passage 33, (iii) a circular forward-angle supply and drainage port 54, which is positioned between the first introduction port 52 and the second introduction port 53 in the valve container 50, and is adjacent to the first introduction port 52, wherein the circular forward-angle supply and drainage port 54 communicates with the forward-angle supply and drainage passage 26, (iv) a circular backward-angle supply and drainage port 55, which is positioned between the first introduction port 52 and the second introduction port 53 in the valve container 50, and is adjacent to the second introduction port 53, wherein the circular backward-angle supply and drainage port 55 communicates with the backward-angle supply and drainage passage 27, (v) a circular drainage port 57, which is positioned at the center between the circular forward-angle supply and drainage port 54 and the circular backward-angle supply and drainage port 55 in the valve container 50, and communicates with the drain passage 36, (vi) a spring 58, provided on an end (i.e., the right side in FIG. 7) of the valve container 50, for forcing the spur 38 toward the other end (i.e., the left side in FIG. 7), and (vii) a control chamber 59, provided on the other end of the valve container 50, for applying a spur control pressure to an end face of the spur 38.

In the spur 38, a circular first guide groove 60 having a groove width striding over the first introduction port 52 and the forward-angle supply and drainage port 54, and a circular second guide groove 61 having a groove width striding over the second introduction port 53 and the backward-angle supply and drainage port 55 are formed on the outer-peripheral face thereof, respectively at two separate positions in the vicinity of the substantial center of the spur 38 in the axial direction. Here, the distance between the first introduction port 52 and the forward-angle supply and drainage port 54 is substantially identical to the distance between the forward-angle supply and drainage port 54 and the drainage port 57. Similarly, the distance between the second introduction port 53 and the backward-angle supply and drainage port 55 is substantially identical to the distance between the backward-angle supply and drainage port 55 and the drainage port 57.

In accordance with the position of the movable spur 38 in the valve container 50, (i) the first guide groove 60 increases or decreases an open area for communication between the forward-angle supply and drainage port 54 and the first introduction port 52 or the drainage port 57, and similarly, (ii) the second guide groove 61 increases or decreases an open area for communication between the backward-angle supply and drainage port 55 and the second introduction port 53 or the drainage port 57.

Also in accordance with the position of the movable spur 38 in the valve container 50, the pressure of the forward-angle supply and drainage port 54 and the pressure of the backward-angle supply and drainage port 55 are reciprocally increased or decreased (i.e., when one increases, the other decreases).

In the passage switching valve 37, the forward or backward position of the spur 38 is basically determined in accordance with a balance between the pushing force of the spring 58 and the spur control pressure supplied to the control chamber 59. However, in the present embodiment, the passage switching valve 37 also has (i) a forward-angle feedback chamber 62 to which the pressure through the forward-angle supply and drainage passage 26 (i.e., from the forward-angle working chamber 24) is supplied, so as to apply this pressure as thrust to the spur 38 in the same direction as that of the pushing force of the spring 58, and (ii) a backward-angle feedback chamber 63 to which the pressure through the backward-angle supply and drainage passage 27 (i.e., from the backward-angle working chamber 25) is supplied, so as to apply this pressure as thrust to the spur 38 in the direction opposite to that of the pushing force of the spring 58. The pressures via the feedback chambers 62 and 63 also contribute to determine the forward or backward position of the spur 38.

More specifically, the forward-angle feedback chamber 62 is formed so as to contact a step face 64 which is formed closer to an end of the spur 38, and the backward-angle feedback chamber 63 is formed so as to contact a step face 65 which is formed closer to the other end of the spur 38. The step faces 64 and 65, which respectively contact the feedback chambers 62 and 63, have the same pressure-receiving area, and force in accordance with a differential pressure between the feedback chambers 62 and 63 is applied to the whole spur 38.

That is, as shown in FIG. 7, with given (i) pressure-receiving area $S1$ of an end face of the spur 38, which contacts the control chamber 59, (ii) pressure-receiving area $S2$ of the step faces 64 and 65 with respect to the feedback chambers 62 and 63, (iii) spur control pressure $Psol$, (iv) pressure $Pr$ in the backward-angle working chamber 25, (v) pressure $Pa$ in the forward-angle working chamber 24, and (vi) reactive force $Fs$ of the spring 58, the balance of force when the position of the spur 38 is controlled is represented by:

$$(Psol \times S1) + (Pr \times S2) = (Pa \times S2) + Fs$$

that is: $(Pa - Pr) \times S2 = Psol \times S1 - Fs$

Therefore, force in accordance with the differential pressure between the forward-angle working chamber 24 and the backward-angle working chamber 25 (i.e., the differential pressure between the feedback chambers 62 and 63) is applied to the spur 38, and the differential pressure between the forward-angle working chamber 24 and the backward-angle working chamber 25 is controlled in proportion to the spur control pressure.

Figure 8:
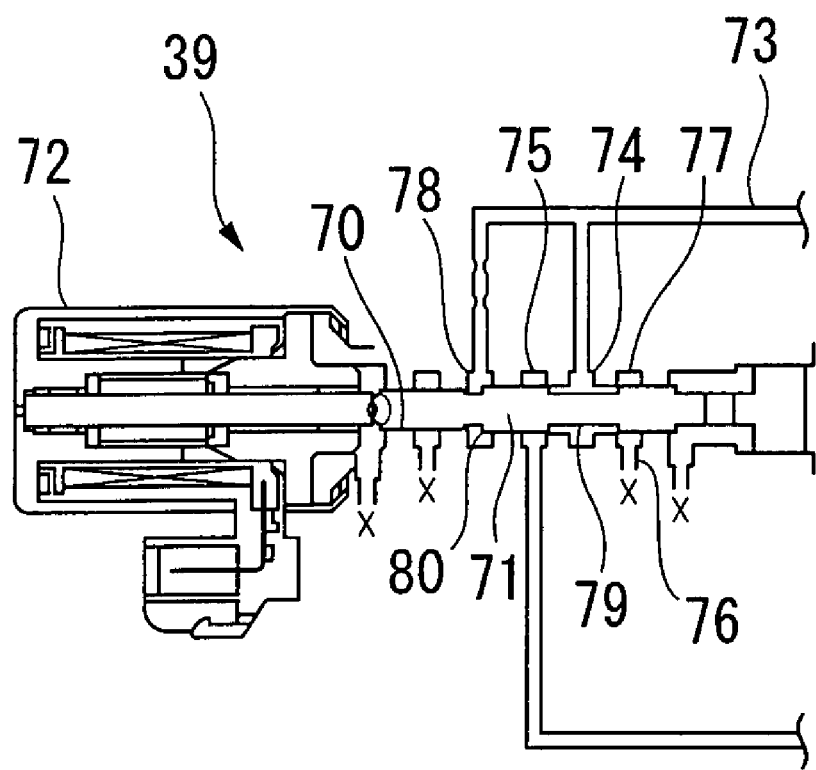
FIG. 8 is a schematic sectional view showing the pressure control valve in the first embodiment.

FIG. 8 is a sectional view showing the pressure control valve 39. As shown in FIGS. 6 and 8, the pressure control valve 39 has (i) a spur 71 contained in a valve container 70 in a freely slidable manner, (ii) an electromagnetic solenoid 72 for moving the spur 71 forward or backward, (iii) a circular control port 74, which is formed on the substantial center of the valve container 70 in the axial direction thereof, and communicates with the control chamber 59 of the passage switching valve 37 via a connection passage 73, (iv) a circular line-pressure port 75, which is formed in the vicinity of a side of the control port 74 in the valve container 70, and communicates with the line passage 33, (v) a drainage port 77, which is formed in the vicinity of the other side of the control port 74 in the valve container 70, and communicates with a drainage passage 76, and (vi) a control-pressure introduction port 78, which is formed in the valve container 70 at a position closer to the electromagnetic solenoid 72, and communicates with the connection passage 73.

The spur 71 has a circular guide groove 79, which is formed on the substantial center of the outer-peripheral face thereof in the axial direction, and always communicates with the control port 74. The amount of overlap between the guide groove 79 and the line-pressure port 75, and the amount of overlap between the guide groove 79 and the drainage port 77 are successively adjusted in accordance with the position of the movable spur 71.

Basically, the forward or backward position of the spur 71 is determined due to a balance between the magnetic force of the electromagnetic solenoid 72 and the force of a reactive-force spring (not shown), and this position is changed in accordance with an increase in the magnetic force of the electromagnetic solenoid 72. More specifically, in an initial state in which the electromagnetic solenoid 72 is switched off, the control port 74 communicates only with the drainage port 77, so that the pressure in the control chamber 59 of the passage switching valve 37 is maintained at the atmospheric pressure. When the electromagnetic solenoid 72 terminates the initial state and is switched on, so as to increase the magnetic force, the spur 71 moves in accordance with the increase in the magnetic force, so that the open area between the control port 74 and the line-pressure port 75 gradually increases. Therefore, the pressure in the control chamber 59 of the passage switching valve 37 gradually increases in accordance with the amount of movement of the spur 71, and the maximum value thereof is the same as the pressure through the line passage 33. Accordingly, the pressure in the control chamber 59 is controlled by the pressure control valve 39 within a range from 0 to the line pressure (i.e., the pressure through the line passage 33).

On the base-end side of the spur 71, a step face 80 is provided, to which the pressure through the connection passage 73 is applied via the control-pressure introduction port 78.

A branch passage 81 is provided to the connection passage 73 (see FIG. 6), and is provided to the reactive-force control chamber 47 of the regulator valve 35. To the reactive-force control chamber 47, the pressure through the connection passage 73, that is, the spur control pressure of the passage switching valve 37 is provided as the above-described adjustment pressure. Therefore, the reactive force against the pressure in the spur control chamber 46 of the regulator valve 35 is obtained by adding the spur control pressure of the passage switching valve 37 to the reactive force of the spring 45. Accordingly, as the spur control pressure increases when the relative phase between the rotors 5 and 6 is changed, the adjustment pressure via the regulator valve 35 increases, thereby resulting in an increase in the pressure of the line passage.

In the motor 1, when the inner-peripheral rotor 6 is positioned backward (i.e., has a backward angle) with respect to the outer-peripheral rotor 5, the facing permanent magnets of the rotors 6 and 5 have opposite poles (i.e., N-pole and S-pole), so that a strengthened magnetic field is produced. In contrast, when the inner-peripheral rotor 6 is positioned forward (i.e., has a forward angle) with respect to the outer-peripheral rotor 5, the facing permanent magnets of the rotors 6 and 5 have the same poles (i.e., N-poles or S-poles), so that a weakened magnetic field is produced. When the inner-peripheral rotor 6 proceeds from the backward-angle side to the forward-angle side, the rotational reactive force between the rotors 6 and 5 increases substantially linearly.

Figure 11A:
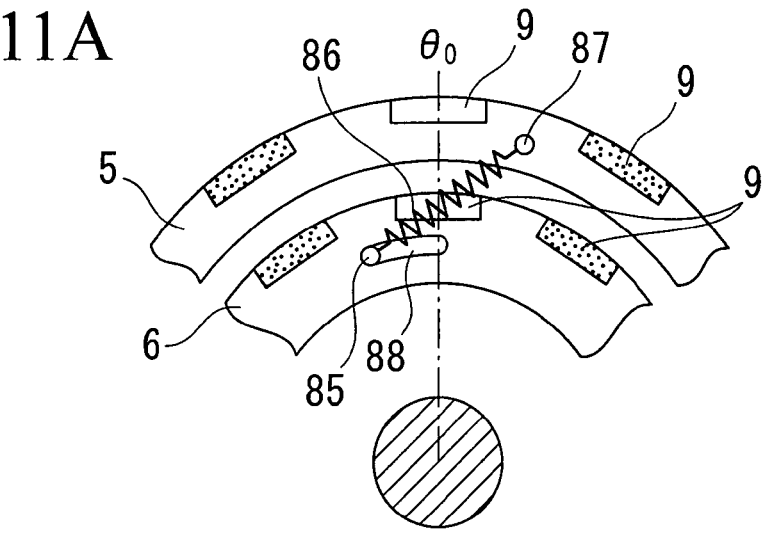
FIGS. 11A to 11C are schematic diagrams showing a successive operation of a device for linearly increasing the rotational reactive force, used in the first embodiment.
Figure 11B:
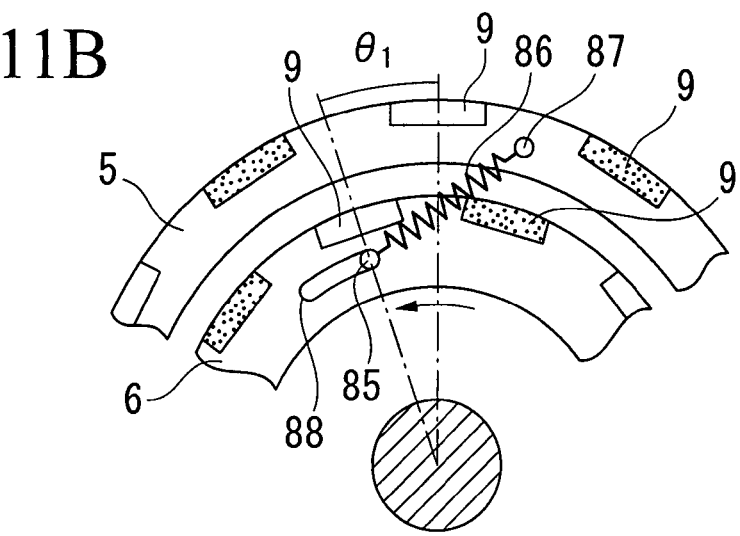
Figure 11C:
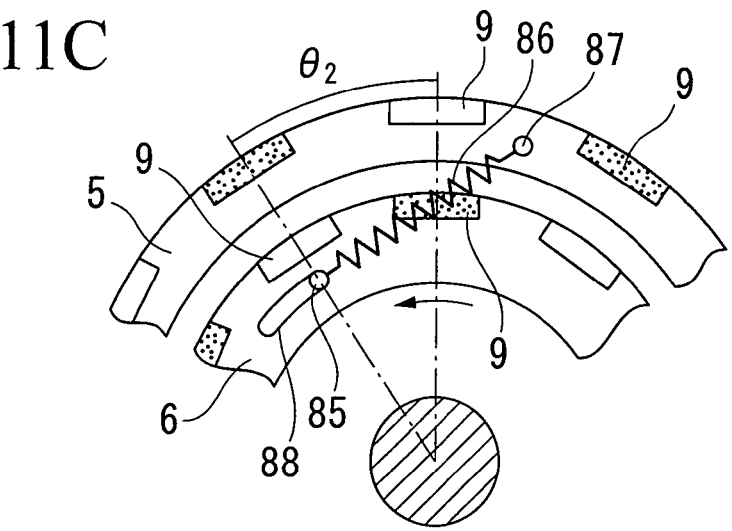

There may be many devices for linearly increasing the rotational reactive force. FIGS. 11A to 11C are schematic diagrams (including slightly different portions in comparison with FIGS. 1 to 4) showing such a device.

FIG. 11A shows a state in which the inner-peripheral rotor 6 is positioned at the most backward angle (i.e., has a rotation angle $\theta_0$), FIG. 11B shows a state in which the inner-peripheral rotor 6 has proceeded by rotation angle $\theta_1$ from the most backward-angle position, and FIG. 11B shows a state in which the inner-peripheral rotor 6 has proceeded by rotation angle $\theta_2$ from the most backward-angle position, that is, to the most forward-angle position.

In the device shown in FIGS. 11A to 11C, an elastic member 86 is provided between the outer-peripheral rotor 5 and the inner-peripheral rotor 6. The elastic member 86 has a spring, one end of which is coupled to the outer-peripheral rotor 5 via a fixed pin 87, and the other end of which is coupled to the inner-peripheral rotor 6 via a movable pin 85. The movable pin 85 is held by a holding groove 88, which has a long-hole shape, in a freely slidable manner.

With respect to the above device shown in FIGS. 11A to 11C, when the inner-peripheral rotor 6 relatively rotates forward from the most backward-angle position (as shown in FIG. 11A), by which opposite poles of the permanent magnets 9 in the inner-peripheral rotor 6 and the outer-peripheral rotor 5 face to each other so as to generate a strengthened magnetic field, the movable pin 85 slides along the holding groove 88 until the rotation angle of the rotor 6 has reached $\theta_1$ (see FIG. 11B) from $\theta_0$; thus, almost no force is applied by the elastic member 86 within this range.

As shown in FIG. 11B, when the rotation angle of the inner-peripheral rotor 6 has reached $\theta_1$ with respect to the outer-peripheral rotor 5, the movable pin 85 reaches an end of the holding groove 88, and the sliding operation thereof is restricted.

When the inner-peripheral rotor 6 further rotates forward from angle $\theta_1$, it pulls and transforms the elastic member 86 in accordance with the rotation angle thereof (see FIG. 11C).

Figure 12:
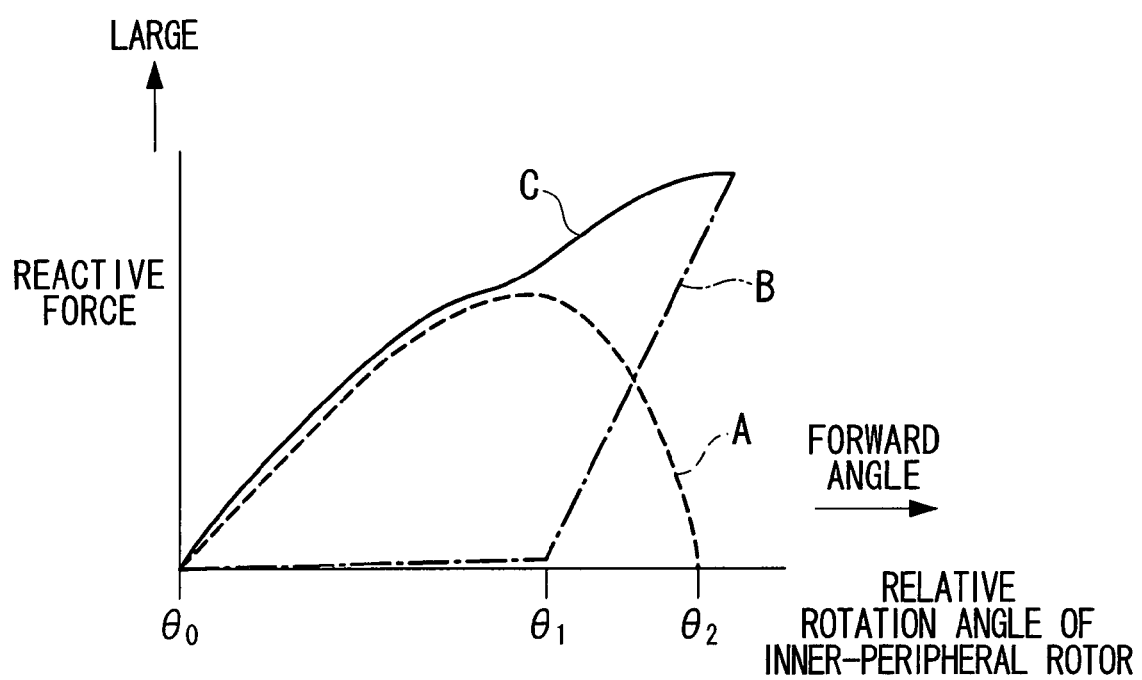
FIG. 12 is a graph showing a variation in the rotational reactive force with respect to the increase in the relative rotation angle of the inner-peripheral rotor in the first embodiment.

FIG. 12 is a graph showing a variation in the rotational reactive force with respect to the increase in the relative rotation angle of the inner-peripheral rotor 6. As shown by the characteristic line B in FIG. 12, after the pulling of the elastic member 86 starts, the reactive force increases substantially in proportion to the increase in the rotation angle. When the relative rotation angle of the inner-peripheral rotor 6 reaches $\theta_2$ (i.e., the most forward position), a weakened magnetic field is produced in which the same poles (i.e., N-poles or S-poles) of the permanent magnets 9 in the outer-peripheral rotor 5 and the inner-peripheral rotor 6 face each other.

In addition, when the inner-peripheral rotor 6 proceeds forward from the most backward-angle position, each permanent magnet 9 of the rotor 6, which has faced the corresponding permanent magnet of the outer-peripheral rotor 5 in a manner such that the opposite poles (i.e., N-pole and S-pole) face each other, gradually shifts along the rotation direction, so that (i) a magnetic reactive force increases substantially in proportion to the rotation angle until the rotation angle reaches $\theta_1$, and (ii) the magnetic reactive force gradually decreases (after the rotation angle has reached $\theta_1$) until the rotation angle reaches $\theta_2$ (see characteristic line A in FIG. 12).

In the motor 1 which employs the above device, (i) while the inner-peripheral rotor 6 rotates from the most backward-angle position to the rotation angle $\theta_1$, only the magnetic reactive force by the permanent magnets 9 is applied, and (ii) while magnetic reactive force increases from $\theta_1$ to $\theta_2$, the (spring) reactive force due to the elastic member 86 (i.e., a pulled spring) is added to the magnetic reactive force generated by the permanent magnets 9. Therefore, the total rotational reactive force (see characteristic line C in FIG. 12) including the magnetic reactive force and the spring reactive force substantially linearly increase with respect to the increase in the rotation angle of the inner-peripheral rotor 6.

As described above, in the motor 1, the rotational reactive force between the inner-peripheral rotor 6 and the outer-peripheral rotor 5 substantially linearly increases in accordance with the relative forward rotation of the rotor 6; thus, the relative rotation angle between the rotors 6 and 5 can be voluntarily controlled by controlling the differential pressure between the forward-angle working chamber 24 and the backward-angle working chamber 25 so that the differential pressure balances with the rotational reactive force. Specifically, when the spur control pressure of the passage switching valve 37 is controlled using the pressure control valve 39, the relative rotation angle between the rotors 5 and 6 is adjusted at an angle corresponding to the spur control pressure.

When the inner-peripheral rotor 6 is held at the most backward-angle position so as to operate the motor 1 in a strengthened magnetic field, the electromagnetic solenoid 72 of the pressure control valve 39 is set off, so that the control port 74 communicates with the drainage port 77 (see FIG. 6). Accordingly, the pressure in the control chamber 59 of the passage switching valve 37 is escaped outside through the connection passage 73, so that the pressure in the control chamber 59 is maintained at the atmospheric pressure.

In the above process, the spur 38 in the passage switching valve 37 is displaced toward the control chamber 59 so as to provide the maximum displacement, as shown in FIGS. 6 and 7, so that the forward-angle supply and drainage port 54 communicates with the drainage port 57, and the backward-angle supply and drainage port 55 communicates with the second introduction port 53. Accordingly, the pressure through the line passage 33 is applied to the backward-angle working chamber 25, and the inner-peripheral rotor 6 and the circular housing 15 is held at the most backward-angle position with respect to the outer-peripheral rotor 5 and the vane rotor 14.

On the other hand, when the inner-peripheral rotor 6 is displaced to the most forward-angle position so as to operate the motor 1 in a weakened magnetic field, the electromagnetic solenoid 72 of the pressure control valve 39 is turned on, so that the control port 74 communicates with the line-pressure port 75. Accordingly, the working liquid in the line passage 33 is drawn via the connection passage 73 into the control chamber 59 of the passage switching valve 37, so that the pressure in the control chamber 59 increases.

In the above process, the spur 38 in the passage switching valve 37 is displaced toward the end of the valve container 50, which is opposite to the control chamber 59, so that the forward-angle supply and drainage port 54 communicates with the first introduction port 52, and the backward-angle supply and drainage port 55 communicates with the drainage port 57. Accordingly, the pressure through the line passage 33 is applied to the forward-angle working chamber 24, and the working liquid in the backward-angle working chamber 25 is drained to the drain passage 36. As a result, the inner-peripheral rotor 6 and the circular housing 15 rotate forward relatively with respect to the outer-peripheral rotor 5 and the vane rotor 14. In order to held the motor 1 in the weakened magnetic field, the pressure through the line passage 33 is continuously applied to the control chamber 59 by means of the control using the pressure control valve 39.

In order to position the inner-peripheral rotor 6 at any point between the most backward-angle position and the most forward-angle position, the spur control pressure (applied to the control chamber 59) is adjusted to a value corresponding to a target rotation angle, by using the electromagnetic solenoid 72 of the pressure control valve 39. In accordance with the above control of the spur control pressure, the relative rotation of the inner-peripheral rotor 6 stops at a rotation angle at which the relative rotation force of the inner-peripheral rotor 6 due to the differential pressure between the forward-angle working chamber 24 and the backward-angle working chamber 25 balances with the rotational reactive force between the rotors 5 and 6.

As described above, the phase varying device 12 of the motor 1 (i) performs distribution (by using the passage switching valve 37 of a spur type) with respect to the supply and drainage of the working liquid between the forward-angle working chambers 24 and the backward-angle working chambers 25 in the rotation mechanism 11, and (ii) controls the position of the spur in the passage switching valve 37 by means of the pressure of the working liquid, which is generated by the electromagnetic pressure control valve 39 based on the line pressure. Therefore, the relative phase between the rotors 5 and 6, which require a relatively large amount of working fluid, can be reliably varied at any timing, without using an electromagnetic valve, which has a large size.

In addition, the phase varying device 12 can perform control of the supply and drainage of the working liquid to and from the forward-angle working chambers 24 and the backward-angle working chambers 25 simultaneously, by using the common spur 38 of the passage switching valve 37. Therefore, one passage switching valve 37 and one pressure control valve 39 are sufficient for this control. Accordingly, in comparison with a structure in which an individual control mechanism is provided to each of the forward-angle working chambers 24 and the backward-angle working chambers 25, the number of necessary parts can be reduced, thereby reducing the device size and the manufacturing cost.

Additionally, in the phase varying device 12 of the motor 1, the passage switching valve 37 has the forward-angle feedback chamber 62 and the backward-angle feedback chamber 63, from which the spur 38 receives thrust at each corresponding pressure-receiving face, which has the same area. Therefore, the differential pressure between the forward-angle working chambers 24 and the backward-angle working chambers 25 can be controlled by the spur control pressure (i.e., the pressure in the control chamber 59) generated via the pressure control valve 39.

Furthermore, in the motor 1, as the inner-peripheral rotor 6 gradually proceeds from a backward-angle position to a forward-angle position, the rotational reactive force between the rotors 5 and 6 increases substantially linearly. Therefore, by controlling the differential pressure between the forward-angle working chambers 24 and the backward-angle working chambers 25 using the pressure control valve 39, the relative rotational positions of the rotors 5 and 6 can be adjusted to those at which the differential pressure and the rotational reactive force can balance with each other.

Therefore, in the motor 1, the relative phase between the rotors 5 and 6 can be accurately set to a desired value without measuring relative rotational positions of the rotors 5 and 6 by using a sensor; thus, it is possible to reduce the number of parts, and simplify the control of the pressure control valve.

In addition, in the phase varying device 12 of the motor 1, the pressures of the forward-angle working chambers 24 and the backward-angle working chambers 25 are applied as thrust to the spur 38 respectively via the feedback chambers 62 and 63. Therefore, if the relative positions of the rotors 5 and 6 vary due to a disturbance while the control using the pressure control valve 39 is maintained in a constant state, the relative positions of the rotors 5 and 6 are automatically corrected. Accordingly, in the motor 1, an error in the phase due to a disturbance can be removed without performing a complex control.

Additionally, in the motor 1, the spur control pressure, which is controlled by the pressure control valve 39, is provided to the reactive-force control chamber 47 of the regulator valve 35, and the pressure of the line passage 33 is varied in accordance with this provided pressure. Therefore, even if the rotational reactive force between the rotors 5 and 6 increases when the inner-peripheral rotor 6 is relatively rotated forward, the relative phase can be reliably varied using a line pressure corresponding to the increase in the rotational reactive force.

In the above-described first embodiment, the forward-angle feedback chamber 62 and the backward-angle feedback chamber 63 are provided to the passage switching valve 37, and the rotational reactive force between the outer-peripheral rotor 5 and the inner-peripheral rotor 6 is varied substantially linearly, so that the inner-peripheral rotor 6 can be set to a desired relative position in accordance with a balance between the differential pressure between the forward-angle working chamber(s) 24 and the backward-angle working chamber(s) 25, which is controlled by the pressure control valve 39, and the rotational reactive force between the rotors 5 and 6.

Figure 13:
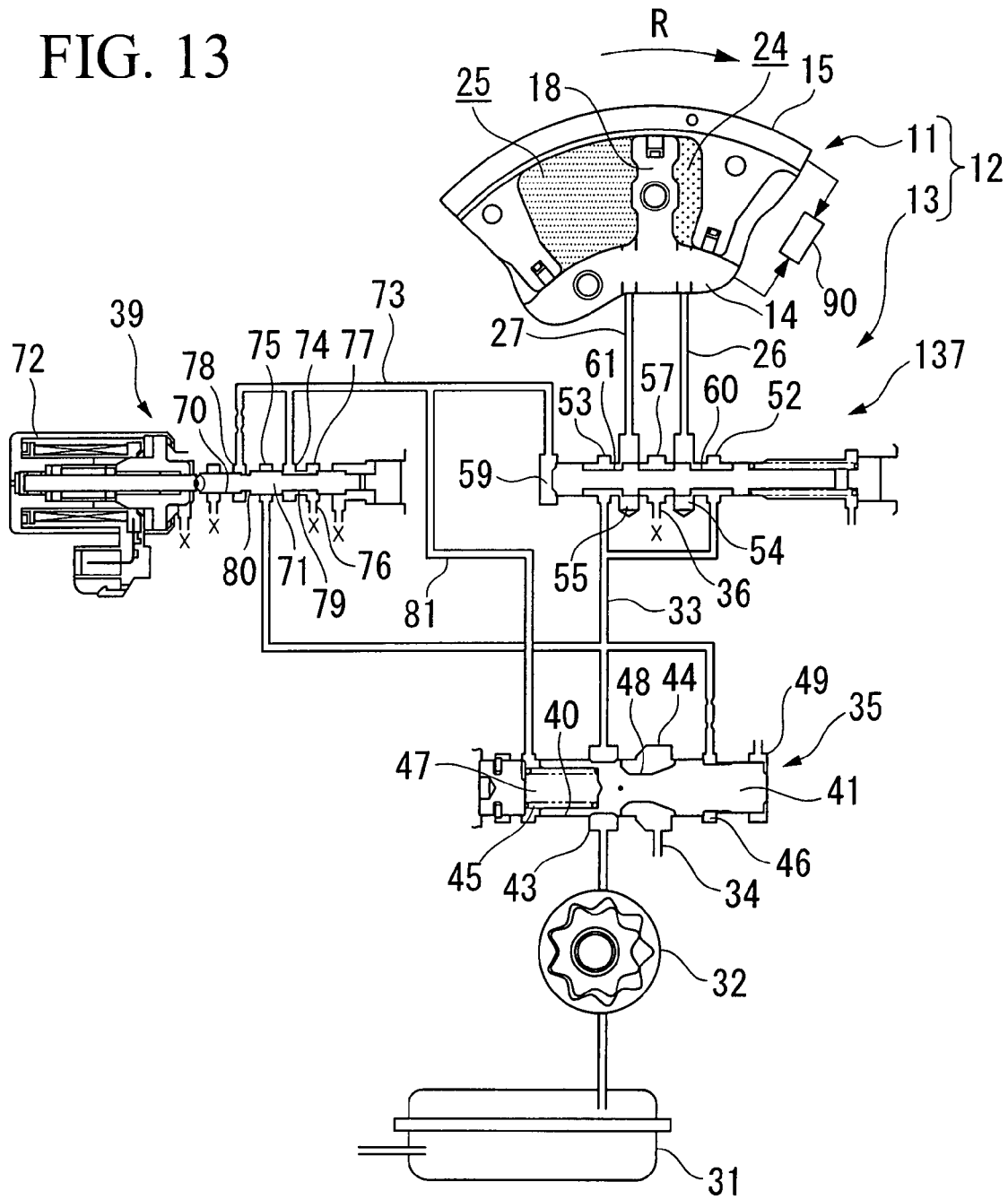
FIG. 13 shows an oil-pressure circuit which mainly has the oil-pressure control device in the phase varying device of a motor as a second embodiment in accordance with the present invention.

FIG. 13 is a diagram showing an oil-pressure circuit which mainly has the oil-pressure control device 13 of a motor as a second embodiment of the present invention. As shown in FIG. 13, a passage switching valve 137 is provided which has no forward-angle feedback chamber and no backward-angle feedback chamber, and instead of these feedback chambers, a sensor 90 for measuring relative rotational positions of the vane rotor 14 (corresponding to the outer-peripheral rotor 5) and the circular housing 15 (corresponding to the inner-peripheral rotor 6) is provided. Feedback control of the electromagnetic solenoid 72 in the pressure control valve 39 may be performed based on the relative rotational positions measured by the sensor 90. In FIG. 13, parts identical to those of the first embodiment are given identical reference numerals.

Figure 14:
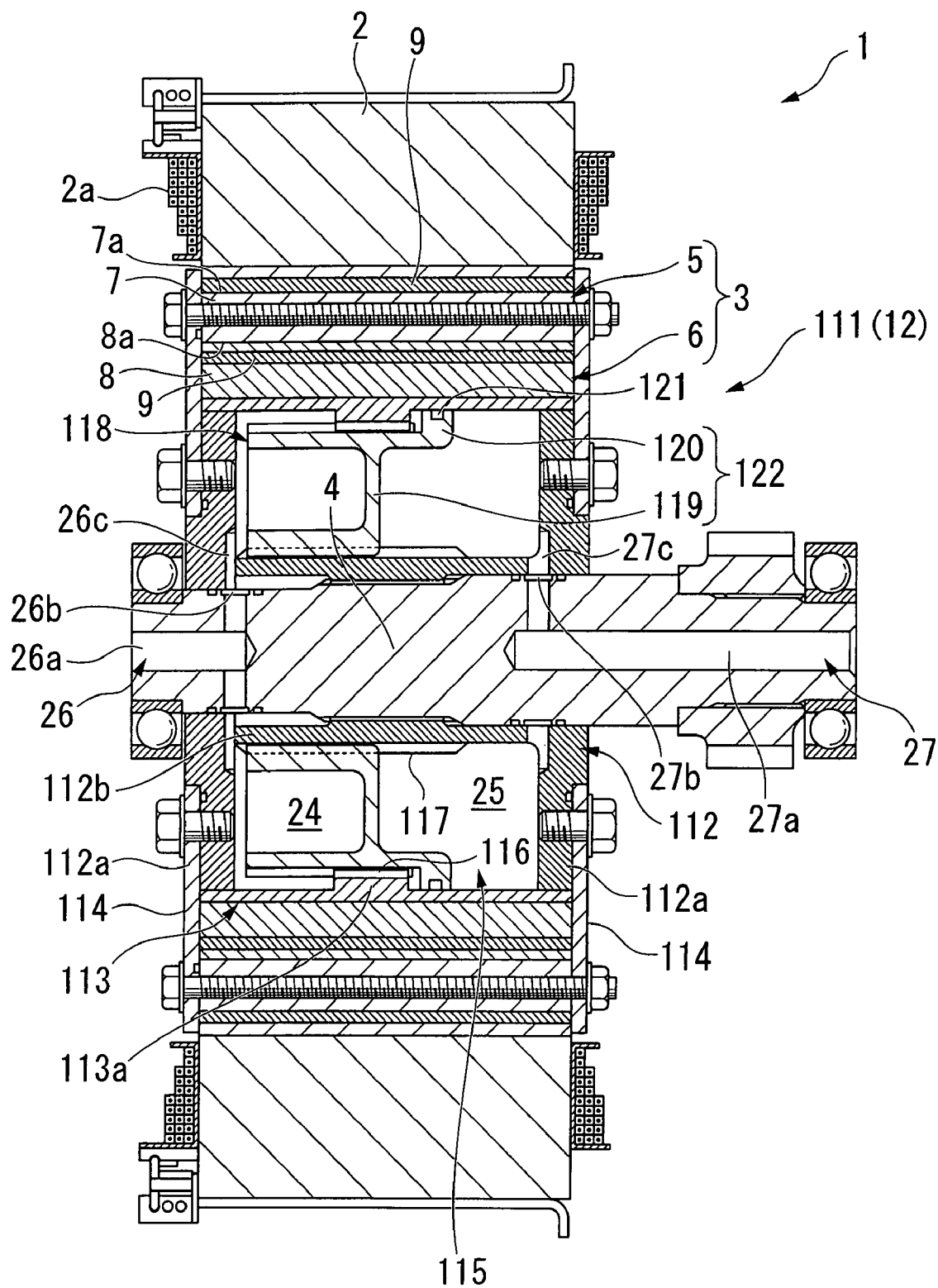
FIG. 14 is a sectional view of main parts of a motor as a second embodiment in accordance with the present invention.
Figure 15:
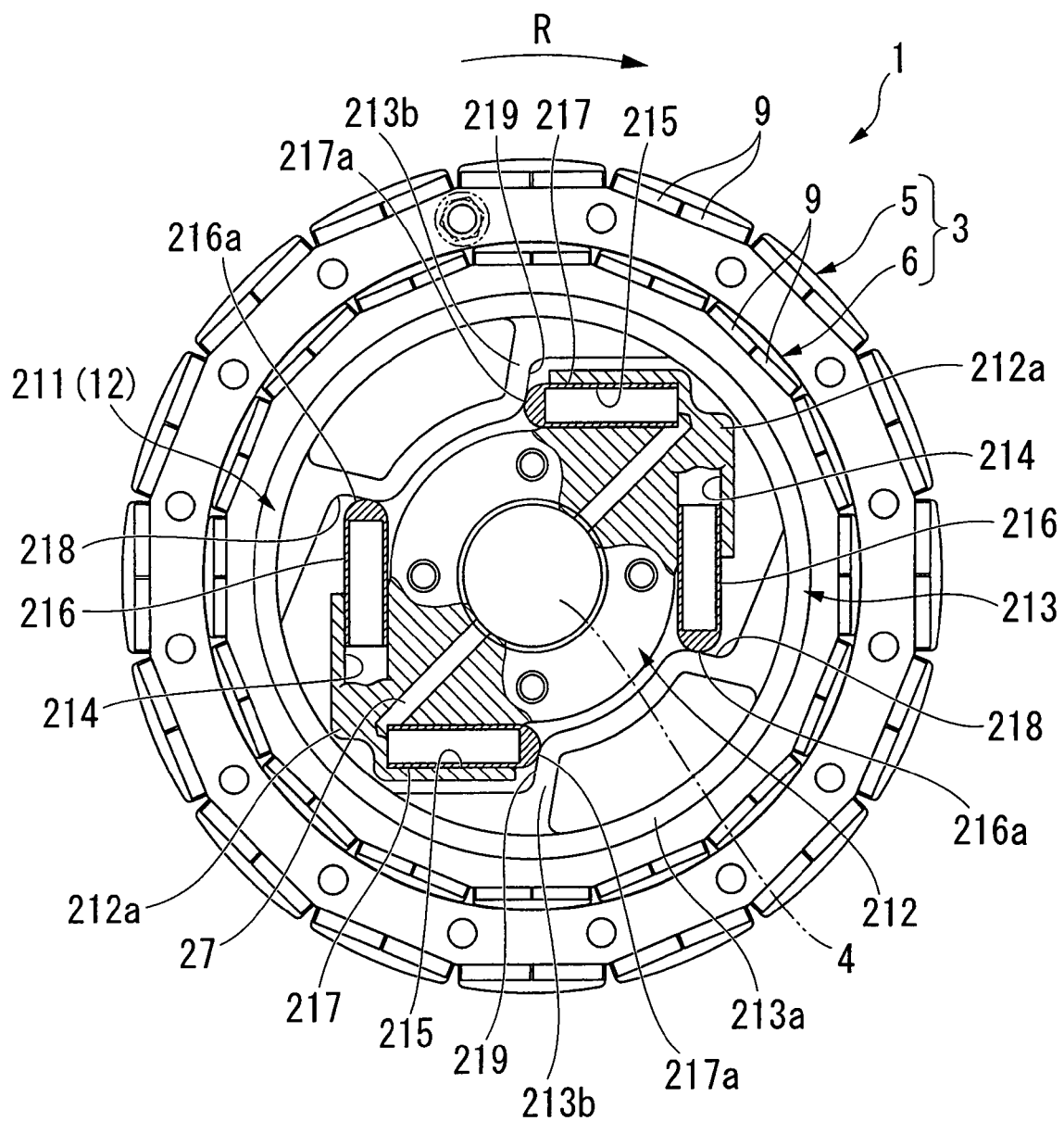
FIG. 15 is a side view showing a rotor unit of a motor as a fourth embodiment in accordance with the present invention.

FIG. 14 is a sectional view of main parts of a motor as a third embodiment of the present invention. FIG. 15 is a side view showing a rotor unit of a motor as a fourth embodiment of the present invention.

The motors 1 of the third and fourth embodiments respectively have rotation mechanisms 111 and 211 (each belonging to the phase varying device 12), which are each different from the rotation mechanism 11 of the first embodiment. The other structural elements of each of the third and fourth embodiments are substantially identical to those of the first embodiment; thus, parts identical to those in the first embodiment are given identical reference numerals, and duplicate explanations are omitted.

The rotation mechanism 111 of the third embodiment, shown in FIG. 14, has (i) an inner cylindrical member 112 (i.e., a first member) which has a bobbin form, and is fit to the outer face of the rotating shaft 4 via splines in a manner such that the inner cylindrical member can rotate together with the rotating shaft 4, and (ii) an outer cylindrical member 113 (i.e., a second member) arranged on the outer periphery of the inner cylindrical member 112. The outer cylindrical member 113 is integrally fit and fixed to the inner-peripheral face of the inner-peripheral rotor 6, and side walls 112a of the inner cylindrical member 112 on outer sides thereof in the axial direction are integrally coupled to the outer-peripheral rotor 5 via a pair of drive plates 114 (also as the first member), each striding over side ends of the outer cylindrical member 113 and the inner-peripheral rotor 6. In this rotation mechanism 111, the inner cylindrical member 112 is integral with the rotating shaft 4 and the outer-peripheral rotor 5, and the outer cylindrical member 113 is integral with the inner-peripheral rotor 6.

The outer cylindrical member 113 is fit around the outer-peripheral faces of the side walls 112a in the inner cylindrical member 112, in a freely slidable manner. In addition, an introduction space 115, having a cylindrical form, is provided between the inner cylindrical member 112 and the outer cylindrical member 113, where a working liquid is supplied to the space.

The outer cylindrical member 113 has a thicker part 113a (i.e., a cylindrical part), which is formed on the substantial center of the inner-peripheral face of the member 113 in the axial direction, and protrudes inward in radial directions. On the inner-peripheral face of the thicker part 113a and the outer-peripheral face of a part (on the left side in FIG. 14) of a shaft part 112b in the inner cylindrical member 112, helical splines 116 and 117 are respectively formed in opposite helical directions. Between the shaft part 112b of the inner cylindrical member 112 and the outer cylindrical member 113, a ring gear 118 is inserted, which is engaged with the helical spline 117 on the outer periphery of the shaft part 112b and the helical spline 116 on the inner periphery of the outer cylindrical member 113. That is, on the inner-peripheral face and the outer-peripheral face of the ring gear, similar splines to be engaged with the helical splines 117 and 116 are formed, where reference numerals of such similar splines are omitted in FIG. 14.

The ring gear 118 has a double-cylindrical form, where one ends of "double cylinders" (i.e., on one end of the ring gear 118) are coupled via a sealing wall 119. In addition, an end (at the sealing wall 119) of the outer-peripheral wall of the ring gear 118 extends cylindrically, and a flange portion 120 is provided on the head of the protruding part. The flange portion 120 protrudes outward in radial directions, and an outer-peripheral face of the flange portion 120 is fit via a seal ring 121 to a substantially half part (where no helical spline 116 is formed) of the inner-peripheral face of the outer cylindrical member 113, in a freely slidable manner.

This sealing wall 119 and the flange portion 120 function as a piston 122 which divides the introduction space 115 into front and rear chambers. One of the chambers divided by the piston 122 functions as a forward-angle working chamber 24, and the other functions as a backward-angle working chamber 25. The forward-angle working chamber 24 and the backward-angle working chamber 25 are respectively connected to the forward-angle supply and drainage passage 26 and the backward-angle supply and drainage passage 27, which are formed through the inner cylindrical member 112 and the rotating shaft 4. Similar to the first and second embodiments, the forward-angle supply and drainage passage 26 and the backward-angle supply and drainage passage 27 are each connected to an oil-pressure control device (not shown).

In the rotation mechanism 111 of the present embodiment, when a working liquid is supplied to one of the forward-angle working chamber 24 and the backward-angle working chamber 25, and then the working liquid is drained from the other of the working chambers, the ring gear 118 including the piston 122 moves from one side to the other side in the introduction space 115 in accordance with the differential pressure between the front and rear sides. In this process, the inner cylindrical member 112 and the outer cylindrical member 113, which are engaged with the ring gear 118 respectively via the helical splines 117 and 116, relatively rotate in a relative rotation direction, so that the inner-peripheral rotor 6 rotates forward or backward with respect to the outer-peripheral rotor 5. In contrast, when a working liquid is supplied to the aforementioned other of the forward-angle working chamber 24 and the backward-angle working chamber 25, and then the working liquid is drained from said one of the working chambers, the ring gear 118 including the piston 122 moves from the aforementioned other side to the aforementioned one side in the introduction space 115 in accordance with the differential pressure between the front and rear sides. Therefore, the inner-peripheral rotor 6 is rotated backward or forward with respect to the outer-peripheral rotor 5, similarly.

The rotation mechanism 111 has a simple structure; however, it is possible to reliably perform relative rotation between the inner-peripheral rotor 6 and the outer-peripheral rotor 5 toward desired positions, by using an oil pressure controlled by the oil-pressure control device.

In the embodiment shown in FIG. 14, the piston 122 for dividing the introduction space 115 into two chambers is formed integrally with the ring gear 118. However, the piston and the ring gear may have an individual body, which may be coupled using a coupling member.

In the fourth embodiment shown in FIG. 15, a rotation mechanism 211 has (i) an inner block 212 (i.e., a first member), which is fit around the outer face of the rotating shaft 4 via splines, so that it can rotate together with the rotating shaft 4, and (ii) an outer block 213 (i.e., a second member), which has a substantially cylindrical form and arranged on the outer periphery of the inner block 212. The outer block 213 is fit and integrally fastened to the inner-peripheral face of the inner-peripheral rotor 6, and ends of the inner block 212 in the axial direction are integrally coupled with the outer-peripheral rotor 5 via drive plates (also as the first member, not shown), each striding over side ends of the outer block 213 and the inner-peripheral rotor 6. In this rotation mechanism 211, the inner block 212 is integral with the rotating shaft 4 and the outer-peripheral rotor 5, and the outer block 213 is integral with the inner-peripheral rotor 6.

The inner block 212 has a pair of arm parts 212a, which extend outward in radial directions. On the head of each arm part 212a, a first cylinder 214 and a second cylinder 215 are formed, which are arranged in substantially tangential directions with respect to a circumference around the rotating shaft 4 as the center thereof, and are open toward opposite rotation directions. Into the first cylinder 214 and the second cylinder 215 of each arm part 212a, a first piston 216 and a second piston 217 are respectively inserted in a freely slidable manner. A working liquid is supplied to or drained from each of the cylinders 214 and 215, so as to slide each of the pistons 216 and 217 (respectively corresponding to the cylinders 214 and 215) forward or backward.

Each of the first cylinders 214 is open toward the main rotation direction R of the motor 1, and a forward-angle working chamber 24 is formed between the relevant first cylinder 214 and the relevant first piston 216. Each of the second cylinders 215 is open toward the direction opposite to the main rotation direction R of the motor 1, and a backward-angle working chamber 25 is formed between the relevant second cylinder 215 and the relevant second piston 217. The forward-angle working chambers 24 and the backward-angle working chambers 25 are each connected to an oil-pressure control device similar to that employed in the first or second embodiment, via supply and drainage passages (in FIG. 15, only the backward-angle supply and drainage passage 27 is shown) formed through the inner block 212 and the rotating shaft 4. In addition, the pistons 216 and 217 each have a substantially cylindrical form, whose head part is closed (see head parts 216a and 217a). The head parts 216a and 217a each have a spherical outer face.

The outer block 213 has (i) a cylindrical base part 213a, which is fit and fastened to the inner-peripheral rotor 6, and (ii) a pair of boss parts 213b, which protrude inward from the inner-peripheral face of the base part 213a in radial directions. The boss parts 213b each have (i) a first load-transmitting wall 218 arranged substantially along a radial direction of the rotating shaft 4, and in contact with the head part 216a of the first piston 216, and similarly, (ii) a second load-transmitting wall 219 arranged substantially along a radial direction of the rotating shaft 4, and in contact with the head part 217a of the second piston 217.

In the present embodiment, when a working liquid is supplied to the forward-angle working chambers 24 and thus the working liquid is drained from the backward-angle working chambers 25, the first pistons 216 in the inner block 212 move forward and protrude, while the second pistons 217 move backward (as shown in FIG. 15). In this process, each first piston 216 pushes the corresponding first load-transmitting wall 218 of the outer block 213, so that the outer block 213 rotates forward with respect to the inner block 212. Accordingly, the inner-peripheral rotor 6, which is integral with the outer block 213, also rotates forward with respect to the outer-peripheral rotor 5, which is integral with the inner block 212. From this state, when the working liquid is supplied to the backward-angle working chambers 25, and it is drained from the forward-angle working chambers 24, the second pistons 217 protrude while the first pistons 216 withdraw, so that each second piston 217 pushes the corresponding second load-transmitting wall 219 of the outer block 213, thereby rotating the inner-peripheral rotor 6 backward with respect to the outer-peripheral rotor 5.

The rotation mechanism 211 also has a simple structure; however, it can reliably perform relative rotation of the inner-peripheral rotor 6 and the outer-peripheral rotor 5 by means of the oil pressure.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A motor comprising:
   an inner-peripheral rotor having permanent magnets which are arranged along a circumference thereof;
   an outer-peripheral rotor, which has permanent magnets arranged along a circumference thereof, and is arranged on an outer periphery of the inner-peripheral rotor in a manner such that the outer-peripheral rotor is coaxial and relatively rotatable with respect to the inner-peripheral rotor; and
   a phase varying device for relatively rotating the inner-peripheral rotor and the outer-peripheral rotor so as to vary a relative phase between thereof, wherein the phase varying device includes:
      a forward-angle working chamber for relatively rotating the inner-peripheral rotor in a forward-angle direction with respect to the outer-peripheral rotor, by using pressure of a working fluid supplied to the forward-angle working chamber;
      a backward-angle working chamber for relatively rotating the inner-peripheral rotor in a backward-angle direction with respect to the outer-peripheral rotor, by using pressure of a working fluid supplied to the backward-angle working chamber;
      a fluid supply source for supplying each working fluid;
      a passage switching valve having a spur, for performing distribution with respect to a process of supply and drainage of the working fluid between the forward-angle working chamber and the backward-angle working chamber, in accordance with a position of the spur; and an electromagnetic pressure control valve for controlling pressure of the working fluid supplied from the fluid supply source, and controlling the position of the spur in the passage switching valve based on the controlled pressure of the working fluid, wherein the passage switching valve further comprises:

a forward-angle feedback chamber which communicates with the forward-angle working chamber, and applies thrust to the spur, the thrust corresponding to pressure in the forward-angle working chamber; and a backward-angle feedback chamber which communicates with the backward-angle working chamber, and applies thrust to the spur in a direction opposite the thrust applied by the forward-angle feedback chamber, the thrust corresponding to pressure in the backward-angle working chamber; and in the spur, the area of a pressure-receiving face which contacts the forward-angle feedback chamber is identical to the area of a pressure-receiving face which contacts the backward-angle feedback chamber.

2. The motor in accordance with claim 1, further comprising:

a regulator valve having:

a control spur which moves forward or backward in accordance with balance between force generated by a spring and the pressure of the fluid supplied by the fluid supply source, wherein pressure in a line passage, which communicates with the passage switching valve, is controlled in accordance with a position of the control spur; and a reactive-force control chamber for applying the pressure of the working fluid, which is controlled by the electromagnetic pressure control valve, to the control spur in a direction identical to that in which the force of the spring acts.

3. The motor in accordance with claim 1, wherein:

an introduction space, to which a working fluid can be supplied, is provided between a first member, which rotates integrally with the outer-peripheral rotor, and a second member, which rotates integrally with the inner-peripheral rotor;

a vane for dividing the introduction space into two chambers protrudes into the introduction space in a freely slidable manner from one of the first member and the second member; and the two chambers divided by the vane function as the forward-angle working chamber and the backward-angle working chamber.

4. The motor in accordance with claim 1, wherein:

a shaft part is provided at one of a first member, which rotates integrally with the outer-peripheral rotor, and a second member, which rotates integrally with the inner-peripheral rotor;

a cylindrical part for surrounding an outer side of the shaft part is provided at the other of the first member and the second member;

a ring gear is provided, an inner-peripheral face and an outer-peripheral face of which respectively engage with the shaft part and the cylindrical part via helical splines;

an introduction space, to which a working fluid can be supplied, is provided between the first member and the second member;

a piston for dividing the introduction space into two chambers is contained in the introduction space in a freely slidable manner, and is coupled with the ring gear in a manner such that the piston is movable integrally with the ring gear; and the two chambers divided by the piston function as the forward-angle working chamber and the backward-angle working chamber.

5. The motor in accordance with claim 1, wherein:

a first cylinder and a second cylinder are provided at one of a first member, which rotates integrally with the outer-peripheral rotor, and a second member, which rotates integrally with the inner-peripheral rotor, wherein the first and second cylinders are arranged in substantially tangential directions with respect to a circumference around a rotation axis of the rotors as the center thereof, and are open toward opposite rotation directions;

a first piston and a second piston are respectively inserted into the first cylinder and a second cylinder in a freely slidable manner;

a first load-transmitting wall and a second load-transmitting wall are provided at the other of the first member and the second member, wherein the first load-transmitting wall and the second load-transmitting wall are arranged along substantially radial directions of the rotors, and respectively contact head parts of the first piston and the second piston; and a space between the first cylinder and the first piston and a space between the second cylinder and the second piston respectively function as the forward-angle working chamber and the backward-angle working chamber.

6. A motor comprising:

an inner-peripheral rotor having permanent magnets which are arranged along a circumference thereof;

an outer-peripheral rotor, which has permanent magnets arranged along a circumference thereof, and is arranged on an outer periphery of the inner-peripheral rotor in a manner such that the outer-peripheral rotor is coaxial and relatively rotatable with respect to the inner-peripheral rotor; and a phase varying device for relatively rotating the inner-peripheral rotor and the outer-peripheral rotor so as to vary a relative phase between thereof, wherein the phase varying device includes:

a forward-angle working chamber for relatively rotating the inner-peripheral rotor in a forward-angle direction with respect to the outer-peripheral rotor, by using pressure of a working fluid supplied to the forward-angle working chamber;

a backward-angle working chamber for relatively rotating the inner-peripheral rotor in a backward-angle direction with respect to the outer-peripheral rotor, by using pressure of a working fluid supplied to the backward-angle working chamber;

a fluid supply source for supplying each working fluid;

a passage switching valve having a spur, for performing distribution with respect to a process of supply and drainage of the working fluid between the forward-angle working chamber and the backward-angle working chamber, in accordance with a position of the spur; and an electromagnetic pressure control valve for controlling pressure of the working fluid supplied from the fluid supply source, and controlling the position of the spur in the passage switching valve based on the controlled pressure of the working fluid, wherein a shaft part is provided at one of a first member, which rotates integrally with the outer-peripheral rotor, and a second member, which rotates integrally with the inner-peripheral rotor;

a cylindrical part for surrounding an outer side of the shaft part is provided at the other of the first member and the second member;

a ring gear is provided, an inner-peripheral face and an outer-peripheral face of which respectively engage with the shaft part and the cylindrical part via helical splines;

an introduction space, to which a working fluid can be supplied, is provided between the first member and the second member;

a piston for dividing the introduction space into two chambers is contained in the introduction space in a freely slidable manner, and is coupled with the ring gear in a manner such that the piston is movable integrally with the ring gear; and the two chambers divided by the piston function as the forward-angle working chamber and the backward-angle working chamber.

7. A motor comprising:

an inner-peripheral rotor having permanent magnets which are arranged along a circumference thereof;

an outer-peripheral rotor, which has permanent magnets arranged along a circumference thereof, and is arranged on an outer periphery of the inner-peripheral rotor in a manner such that the outer-peripheral rotor is coaxial and relatively rotatable with respect to the inner-peripheral rotor; and a phase varying device for relatively rotating the inner-peripheral rotor and the outer-peripheral rotor so as to vary a relative phase between thereof, wherein the phase varying device includes:

a forward-angle working chamber for relatively rotating the inner-peripheral rotor in a forward-angle direction with respect to the outer-peripheral rotor, by using pressure of a working fluid supplied to the forward-angle working chamber;

a backward-angle working chamber for relatively rotating the inner-peripheral rotor in a backward-angle direction with respect to the outer-peripheral rotor, by using pressure of a working fluid supplied to the backward-angle working chamber;

a fluid supply source for supplying each working fluid;

a passage switching valve having a spur, for performing distribution with respect to a process of supply and drainage of the working fluid between the forward-angle working chamber and the backward-angle working chamber, in accordance with a position of the spur; and an electromagnetic pressure control valve for controlling pressure of the working fluid supplied from the fluid supply source, and controlling the position of the spur in the passage switching valve based on the controlled pressure of the working fluid, wherein a first cylinder and a second cylinder are provided at one of a first member, which rotates integrally with the outer-peripheral rotor, and a second member, which rotates integrally with the inner-peripheral rotor, wherein the first and second cylinders are arranged in substantially tangential directions with respect to a circumference around a rotation axis of the rotors as the center thereof, and are open toward opposite rotation directions;

a first piston and a second piston are respectively inserted into the first cylinder and a second cylinder in a freely slidable manner;

a first load-transmitting wall and a second load-transmitting wall are provided at the other of the first member and the second member, wherein the first load-transmitting wall and the second load-transmitting wall are arranged along substantially radial directions of the rotors, and respectively contact head parts of the first piston and the second piston; and a space between the first cylinder and the first piston and a space between the second cylinder and the second piston respectively function as the forward-angle working chamber and the backward-angle working chamber.

* * * * *